US011659482B2

(12) United States Patent
Dey et al.

(10) Patent No.: US 11,659,482 B2
(45) Date of Patent: May 23, 2023

(54) METHOD OF SIGNALLING IN AN INTEGRATED ACCESS AND BACKHAUL NETWORK

(71) Applicants: Centre of Excellence in Wireless Technology, Tamil Nadu (IN); Indian Institute Of Technology Madras (IIT Madras), Tamil Nadu (IN)

(72) Inventors: Priyanka Dey, Tamil Nadu (IN); Deepak Padmanabhan Maya, Tamil Nadu (IN); Thirunageswaram Ramachandran Ramya, Tamil Nadu (IN); Chandrasekaran Mohandoss, Tamil Nadu (IN); Abhijeet Abhimanyu Masal, Tamil Nadu (IN); Sunil Kaimalettu, Tamil Nadu (IN); Jeniston Deviraj Klutto Milleth, Tamil Nadu (IN); Bhaskar Ramamurthi, Tamil Nadu (IN)

(73) Assignees: Centre of Excellence in Wireless Technology and, Tamil Nadu (IN); Indian Institute Of Technology Madras (IIT Madras), Tamil Nadu (IN)

( * ) Notice: Subject to any disclaimer, the term of this patent is extended or adjusted under 35 U.S.C. 154(b) by 18 days.

(21) Appl. No.: 17/359,703

(22) Filed: Jun. 28, 2021

(65) Prior Publication Data

US 2021/0410058 A1 Dec. 30, 2021

(30) Foreign Application Priority Data

Jun. 29, 2020 (IN) ............................ 202041027614

(51) Int. Cl.

| | |
|---|---|
| ***H04W 48/18*** | (2009.01) |
| ***H04W 48/16*** | (2009.01) |
| ***H04L 5/14*** | (2006.01) |
| ***H04W 24/02*** | (2009.01) |
| ***H04W 76/10*** | (2018.01) |
| ***H04W 24/08*** | (2009.01) |

(52) U.S. Cl.

CPC .......... *H04W 48/18* (2013.01); *H04L 5/1438* (2013.01); *H04W 24/02* (2013.01); *H04W 24/08* (2013.01); *H04W 48/16* (2013.01); *H04W 76/10* (2018.02)

(58) Field of Classification Search

CPC ..... H04W 48/18; H04W 24/02; H04W 24/08; H04W 48/16

See application file for complete search history.

(56) References Cited

U.S. PATENT DOCUMENTS

2020/0059879 A1* 2/2020 Nam ................ H04W 56/0005

* cited by examiner

*Primary Examiner* — Diane D Mizrahi

(74) *Attorney, Agent, or Firm* — BakerHostetler; Tayan B. Patel

(57) ABSTRACT

The present invention relates to a method of signalling in an Integrated Access and Backhaul (IAB) network. The method comprises signalling metrics from a parent IAB node to a child IAB node for association of the child IAB node with the parent IAB node. Information related to multiplexing capability and supported modes of operation is signalled from the child IAB node to the parent IAB node. An active mode of operation is determined at the child IAB node. Timing Advance (TA) for each active mode of operation, guard information for each active mode of operation, and exchanges for In-Band Full Duplexing (IBFD) mode of operation are signalled. Further, fallback capability of IAB nodes during presence of Self-Interference (SI) is also signalled.

28 Claims, 12 Drawing Sheets

METHOD OF SIGNALLING IN AN INTEGRATED ACCESS AND BACKHAUL NETWORK

CROSS-REFERENCE TO RELATED APPLICATIONS

The instant application claims the benefit of priority of Indian patent application no. 202041027614 filed Jun. 29, 2020, the content of which is incorporated by reference in its entirety.

FIELD OF THE INVENTION

The present invention relates to a signalling aspect, and more particularly to signalling aspects in an Integrated Access and Backhaul (IAB) network.

BACKGROUND OF THE INVENTION

The increase in the demand of high data rates has led to the usage of millimeter wave (mmWave) spectrum where huge bandwidth is available to support higher data rates. However, one of the main shortcomings of mmWave is that it suffers high attenuation and hence cannot provide a large cellular coverage. As a result, the cell size decreases and numerous small cells are required to cover a certain area. As the number of cells increase, it is not possible to connect every base station to the core network using a wired link. In such a scenario, wireless backhaul is a promising solution. Such a network with wireless backhauling is known as an Integrated Access and Backhaul (IAB) Network.

An IAB network consists of a donor node 116, a set of IAB nodes, and a set of access UEs 102, 104, 106, 108. The donor node 116 has a connection to the core network whereas the IAB nodes are connected to the core network through donor node 116. The IAB nodes are connected to donor through wireless backhaul. The entire network operates under the control of the donor node 116. Multi hop scenario is also possible, where IAB nodes attached to the donor node 116 have further child nodes and so on.

Any given IAB node in the network has a parent node which may be the donor node 116 itself or some other IAB node. Similarly, an IAB node in the network may also be a parent node to its child IAB nodes. Both donor and IAB nodes in the network can have their own access UEs 102, 104, 106, 108.

A donor node 116 has a central unit (CU) and a distributed unit (DU). The CU can be in the donor node 116 or at some centralised location. The CU controls the entire IAB network, whereas DU act as parent node for the child nodes and access UEs 102, 104, 106, 108 connected to donor node 116. An IAB node has mobile terminal (MT) unit which is connected to the parent node through parent backhaul link and a DU which is connected to the child nodes through child backhaul link, and the access UEs 102, 104, 106, 108 through access link. The available resources for an IAB node are shared among MT and DU of an IAB node for communicating in backhaul and child/access links. FIG. 1 illustrate the basic deployment of an IAB network with one donor node 116 and, a set of IAB nodes and UEs 102, 104, 106, 108.

For the IAB network to operate, it is necessary to have certain signalling exchange between the parent and child nodes since the operation of the child node is controlled by the parent node. For e.g., the way the resources shared between the MT and DU of child node depends on the hardware capability of the child node and resource configurations signalled by the parent and donor nodes 116.

It is therefore desirable to provide certain signalling exchange mechanism due to which the resource details should be exchanged between nodes in an IAB network.

SUMMARY OF THE INVENTION

The present invention relates to signalling in an Integrated Access and Backhaul (IAB) network.

An aspect of the present invention relates to a method of signalling in an Integrated Access and Backhaul (IAB) network. The method comprises signalling, from a parent IAB node to a child IAB node, information required for association of the child IAB node with the parent IAB node. The information required for association includes at least one of i) at least one of multiplexing capability, hop order, number of child IAB nodes associated, outage probability, and interference and load of the parent IAB node, and ii) a joint metric calculated by the parent IAB node based on at least one of the multiplexing capability, the hop order, the number of child IAB nodes associated, the outage probability, and the interference and load of the parent IAB node. The method further comprises reporting, either separately or jointly, information related to the multiplexing capability and supported modes of operation from the child IAB node to at least one of a Central Unit (CU) of a donor node and the parent IAB node. The reporting is done by a DU of the child IAB node to the CU of the donor node through an F1-AP interface, and by a MT of the child IAB node to a DU of the parent IAB node. The reporting is also done by the DU of the child IAB node to the CU of the donor node through the F1-AP interface. The CU of the donor node forwards the information related to the multiplexing capability and the supported modes of operation to the DU of the parent IAB node through the F1-AP interface.

In one aspect, the information required for association is used by the child IAB node to calculate the joint metric. In one aspect, parent IAB node signals the joint metric along with the multiplexing capability to the child IAB node.

In one aspect, an active mode of operation is determined at the child IAB node by one of the donor node, the parent IAB node and the child IAB node. Further, at least one of several actions are performed. Such actions include a) exchanging information regarding switching from one active mode to another active mode, b) exchanging information regarding default mode, c) exchanging information related to Timing Advance (TA) for each active mode of operation, d) exchanging information related to guard time for each active mode of operation, and e) exchanging information related to In-Band Full Duplexing (IBFD) mode of operation.

In one aspect, the active mode of operation of the child IAB node is determined by the donor node based on the at least one of multiplexing capability and supported modes of the child IAB node, multiplexing capability, supported modes, and resource configuration of the parent IAB node, and network conditions.

In one aspect, the active mode of operation of the child IAB node determined by the donor is communicated to at least one of the parent IAB node and the child IAB node.

In one aspect, the active mode of operation of the child IAB node is determined by the parent IAB node based on at least one of multiplexing capability and supported modes of the child IAB node, resource configuration of the DU of the child IAB node, and active mode of operation of the parent IAB node.

In one aspect, the active mode of operation is derived by the child IAB node by one of explicit signalling from one of the donor node and the parent IAB node, and implicitly based on at least one of resource configuration of MT and DU of the child IAB node, multiplexing capability of the child IAB node, supported modes of the child IAB node, and additional information including TA and guard period received from the parent IAB node.

In one aspect, the duration of the active mode of operation is signalled by the parent IAB node to the child IAB node.

In one aspect, the active mode of operation at the child IAB node is a default mode when information regarding a switch from one active mode to another active mode is not received by the child IAB node from the parent IAB node.

In one aspect, the default mode is signalled to the child IAB node by the parent IAB node.

In one aspect, the TA signalled from the parent IAB node to the child IAB node depends on at least one of the active mode of operation of the parent IAB node, the active mode of operation of the child LAB node, and timing of UL reception at the parent IAB node.

In one aspect, an offset to the TA is signalled from the parent IAB node to the child IAB node.

In one aspect, the TA is updated by initiating a RACH procedure and updating TA value corresponding to a new mode of operation in RAR when a mode switch happens. Alternatively, the TA is updated by signalling the TA values corresponding to a new mode of operation by the parent IAB node to the child IAB node, when the active mode of operation is switched by at least one of the parent IAB node and the child IAB node. The TA is also updated by signalling a set of TA values for all possible modes of operation for a time frame from the parent IAB node to the child IAB node.

In one aspect, guard information for each active mode includes guard symbols. The guard symbols depends on resource configuration of MT and DU of an IAB node, propagation delay in a backhaul link of the IAB node, Downlink (DL) to Uplink (UL) and UL to DL switching time required at the IAB node, TA used for Uplink Transmission (UL-Tx) at the IAB node, and a timing of Uplink Reception (UL-Rx) at the IAB node, wherein the timing of UL-Rx depends on an active mode of operation of the IAB node and its child IAB node. The TA used for UL-Tx depends on an active mode of operation of the IAB node and its parent node.

In one aspect, exchanging guard information includes signalling the guard information for all possible modes of operation from the parent IAB node to the child IAB node. Exchanging the guard information may also include signalling the guard information corresponding to a new mode of operation by the parent IAB node to the child IAB node, when the active mode of operation is switched by at least one of the parent IAB node and the child IAB node.

In one aspect, to prevent overlap between resources at MT and DU of the child IAB node when the DU of the child IAB node is configured as F, signalling of guard information comprises:

a) the parent IAB node inserting guard at the MT of the child IAB node assuming resource configuration of F resource at the DU of the child IAB node as the one corresponding to maximum guard duration, b) the parent IAB node inserting guard at the MT of child IAB node assuming resource configuration of F resource at the DU of the child IAB node as the one corresponding to minimum guard duration, c) the parent IAB node inserting guard at the MT of child IAB node based on the dynamic configuration of the F resource at the DU of the child IAB node, wherein the child IAB node signals the dynamic configuration of the F resource to the parent IAB node; and d) the child IAB node dynamically configuring F resource at the DU such that guard is inserted at the start or end of the F resource to avoid overlap with MT. The F resource is at least one of uplink, downlink, and guard.

In one aspect, when there is overlap between MT and DU of the child IAB node and the DU of the child IAB node is configured as soft resource, signalling of guard information comprises:

a) parent IAB node configures guard only when explicit IA is given for soft resource at the DU of the child IAB node and b) the child IAB node configures guard at least one of start and end of the soft resource, when implicit IA is derived for the soft resource.

In one aspect, signalling of guard information comprises parent IAB node configuring the guard at MT of child IAB node based on the guard inserted at DU of the child IAB node which is signalled by the child IAB node to the parent IAB node and the guard required at MT of the child IAB node which is signalled by the child IAB node to the parent IAB node.

In one aspect, the child IAB node evaluates the guard required at MT of the child IAB node based on the guard present in DU of the child IAB node.

In one aspect, the signalling exchanges for IBFD mode of operation comprises the child IAB node informing the parent IAB node about the IBFD capability of at least one of MT and DU of the child IAB node.

In one aspect, the signalling exchanges for IBFD mode of operation comprises two parent nodes exchanging resource configuration information for proper scheduling of an IBFD capable User Equipment (UE) when the UE simultaneously connects with the two parent nodes with Half Duplex (HD) capable DUs.

In one aspect, exchanges regarding at least one of switching mode of operation and interference measurement are signalled. The signalling exchange for interference measurement comprises the child IAB node requesting a measurement guard period to the parent IAB node. The guard period is one of periodic and aperiodic, and is requested in terms of one of absolute time and number of symbols.

In one aspect, periodicity of the guard period is requested in terms of one of absolute time, number of symbols, number of slots, number of subframes, and number of frames.

In one aspect, the signalling exchanges for switching mode of operation comprises the child IAB node requesting the parent IAB node for switching to a different mode of operation.

In one aspect, the child IAB node switches to the different mode of operation on receiving grant from the parent IAB node.

In one aspect, exchanges are signalled for switching mode of operation comprises the parent IAB node signalling to the child IAB node grant for mode switching and necessary parameters associated with the new mode wherein the parameters are at least one of TA, guard, and measurement guard period.

BRIEF DESCRIPTION OF THE DRAWINGS

The accompanying drawings are included to provide a further understanding of the present disclosure, and are incorporated in and constitute a part of this specification.

The drawings illustrate exemplary embodiments of the present disclosure and, together with the description, serve to explain the principles of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 1:
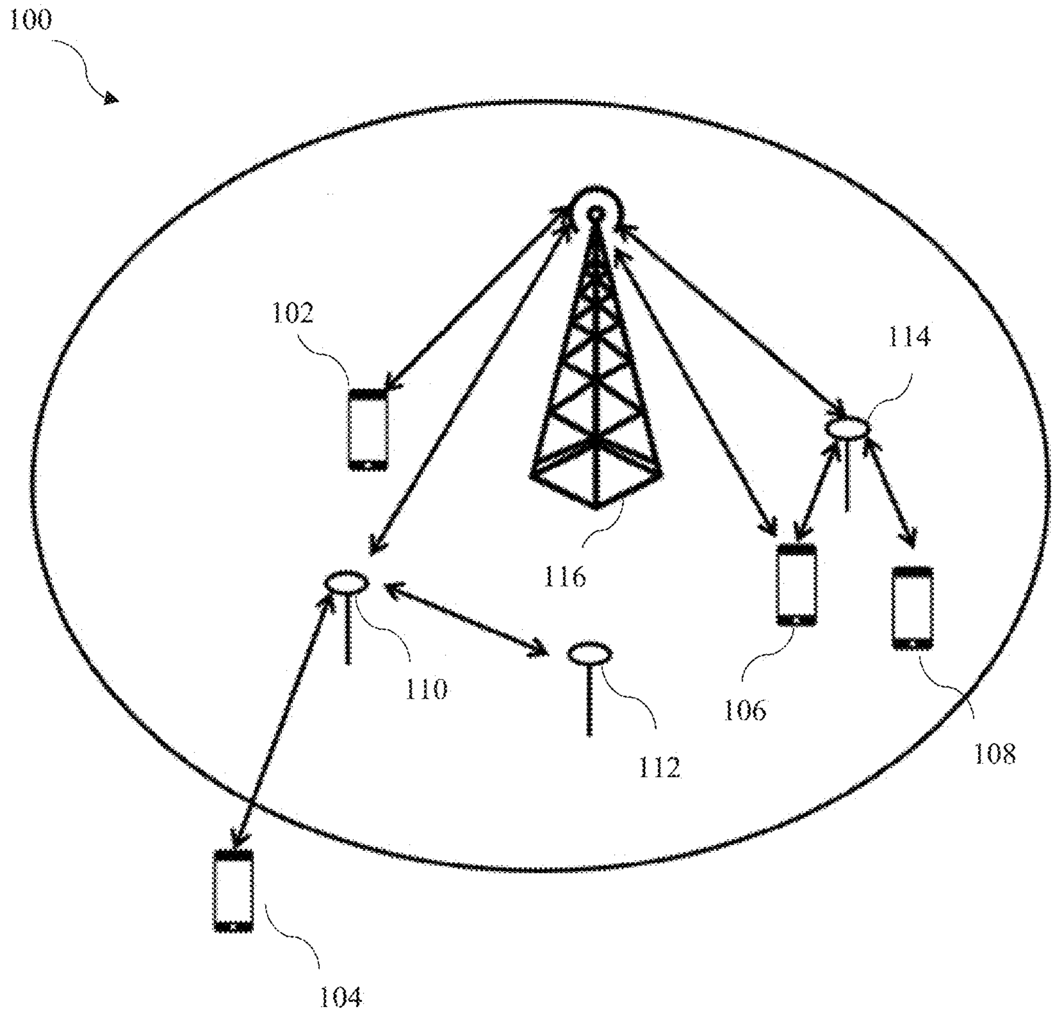
FIG. 1 illustrates an IAB network including IAB nodes and User Equipment, in accordance with an embodiment of the present invention.

FIG. 1 illustrates an IAB network including IAB nodes and User Equipment (UE), in accordance with an embodiment of the present invention. The IAB network includes UEs 102, 104, 106, and 108, IAB nodes 110, 112, and 114, and a donor node 116. IAB node 110 is a child node of the donor node 116 and a parent node of the IAB node 112. The IAB node 112 is a child node of the IAB node 110. The communication link between the IAB node 110 and the IAB node 112 is a child link for the IAB node 110 and a backhaul link for the IAB node 112. The communication link between the IAB node 110 and the donor node 116 is a backhaul link for the IAB node 110.

In one embodiment, the various signalling aspects related to the operation of an IAB network are described. The abbreviations explained below have been used throughout the invention.

IAB-MT: MT of IAB node

IAB-DU: DU of IAB node

Parent-MT: MT of parent node

Parent-DU: DU of parent node

Child-MT: MT of child node

Child-DU: DU of child node

F: Flexible resources (Flexible resources are resources which can be configured to DL/UL/guard)

H: Hard (e.g., DU can use the H resource for transmission/reception regardless of the MT's configuration)

S: Soft (e.g., DU can use the S resource for transmission/reception only if MT of child node does not transmit/receive in the resource, transmission/reception in MT of child node is not changed due to use of the resource by DU of child node or parent node signals indication of availability to use the S resource for transmission/reception in DU of child node)

NA: Not available (e.g., DU cannot use the resource for transmission/reception in child/access link)

In one embodiment, multiplexing capability and supported mode of operation may be determined in the IAB network. The resources in which an IAB node operates can be shared between IAB-MT and IAB-DU in time, frequency, space and code domain and are called Time Division Multiplexing (TDM), Frequency Division Multiplexing (FDM), Space Division Multiplexing (SDM), and Code Division Multiplexing (CDM) respectively. In the case of TDM, any one link (MT or DU) will be active at a given time instant. In the case of SDM/FDM, both MT and DU links can be active at the same time. However, some IAB nodes that support SDM/FDM are subjected to Half Duplexing Constraint (HDC), where the node can either transmit in both the links or receive in both the links in the same or different time-frequency resources. Certain IAB nodes can use the same time-frequency resources for transmission in MT and reception in DU and vice versa and this is known as In Band Full Duplexing (IBFD). TDM, CDM, FDM, FDM with HDC, SDM, SDM with HDC and IBFD are known as the multiplexing capabilities of an IAB node. An IAB node can utilize these multiplexing capabilities for transmission and reception in backhaul and child/access links. The transmission and reception patterns followed in an IAB node are known as the modes of operation of the IAB node. Based on the multiplexing capability, the IAB node supports different modes of operation. The different modes possible for an IAB node are as follows.

a. Time Division Multiplexing (TDM)

b. Simultaneous Reception at DU and MT (SRxDM)

c. Simultaneous Transmission at DU and MT (STxDM)

d. DU receive and MT transmit (DURx_MTTx)

e. DU transmit and MT receive (DUTx_MTRx)

Figure 2A:
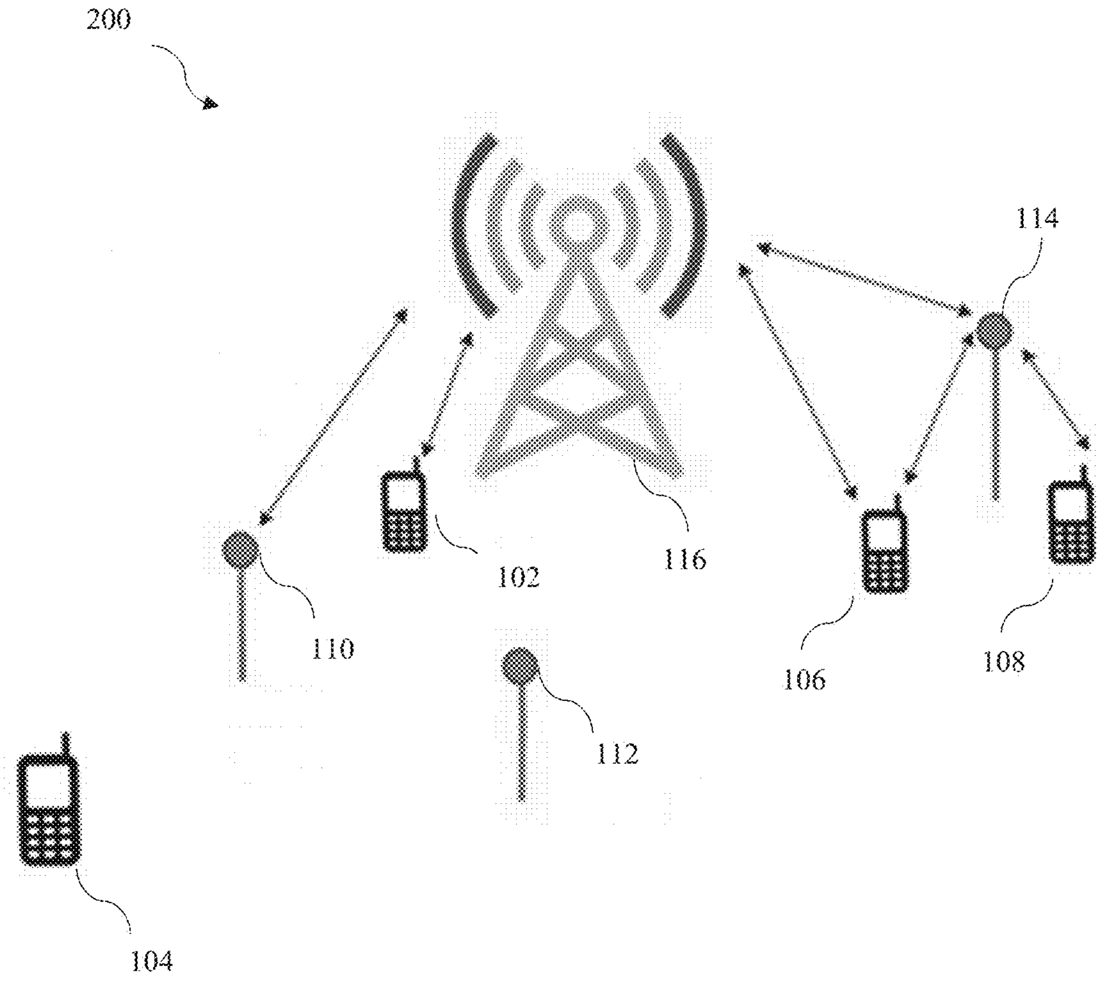
FIGS. 2*a* and 2*b* illustrate transmission and reception patterns in various modes of operation of an IAB node, in accordance with an embodiment of the present invention.
Figure 2B:
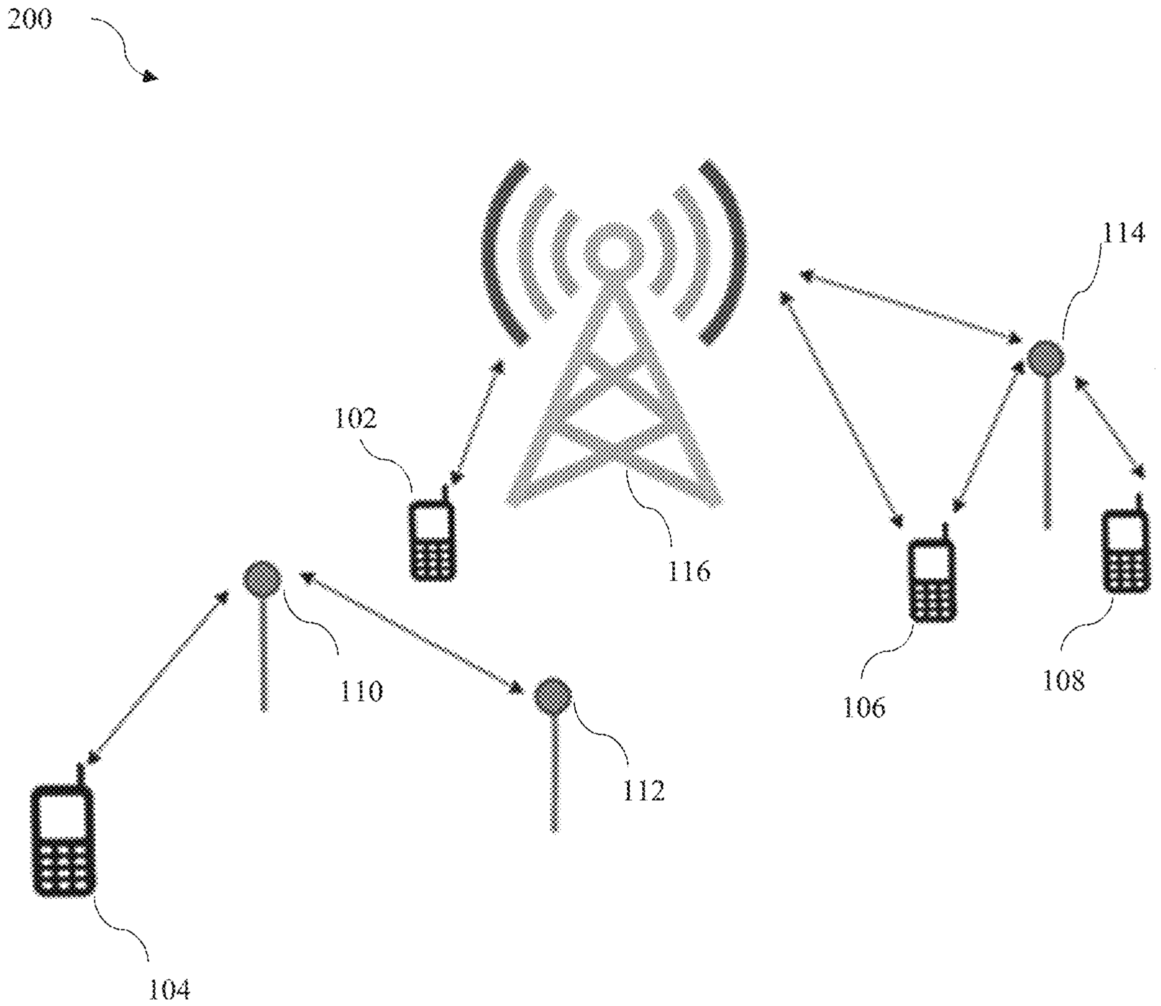
Figure 3:
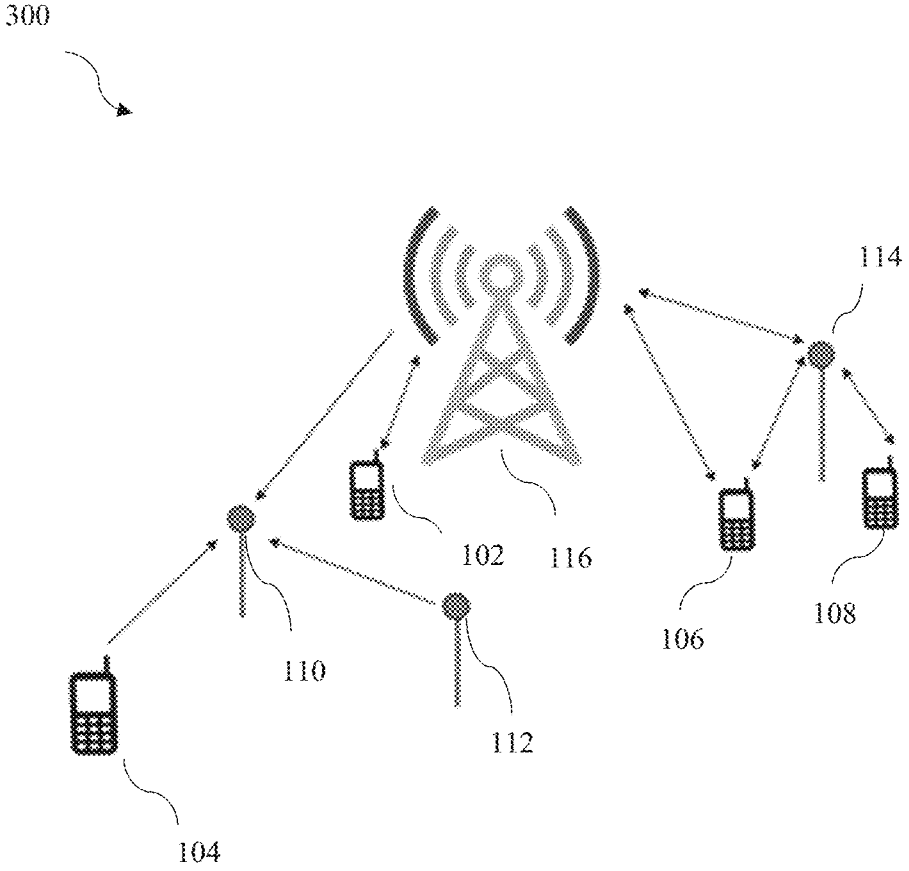
FIG. 3 illustrates transmission and reception patterns in various modes of operation of an IAB node, in accordance with an embodiment of the present invention.

FIG. 2 to FIG. 6 illustrate the transmission and reception patterns in various modes of operation of an IAB node. In FIG. 2, IAB node 110 is in TDM mode of operation. In FIG. 2*a*, only the MT of IAB node 110 is active and is communicating with the donor node 116, whereas in FIG. 2*b*, the DU of the IAB node 110 is communicating with access UE/MT of IAB Node 112. In FIG. 3, IAB node 110 is in SRxDM mode so that both MT and DU receive at the same time. This reception can be done in any of the below mentioned ways.

i. In the same time-frequency resources but different beams known as Spatial Division Multiplexing (SDM).

ii. In the same time but different frequency resources on the same carrier known as Frequency Division Multiplexing (FDM).

iii. In the same time but different frequency resources on different carriers known as Frequency Division Duplexing (FDD).

Figure 4:
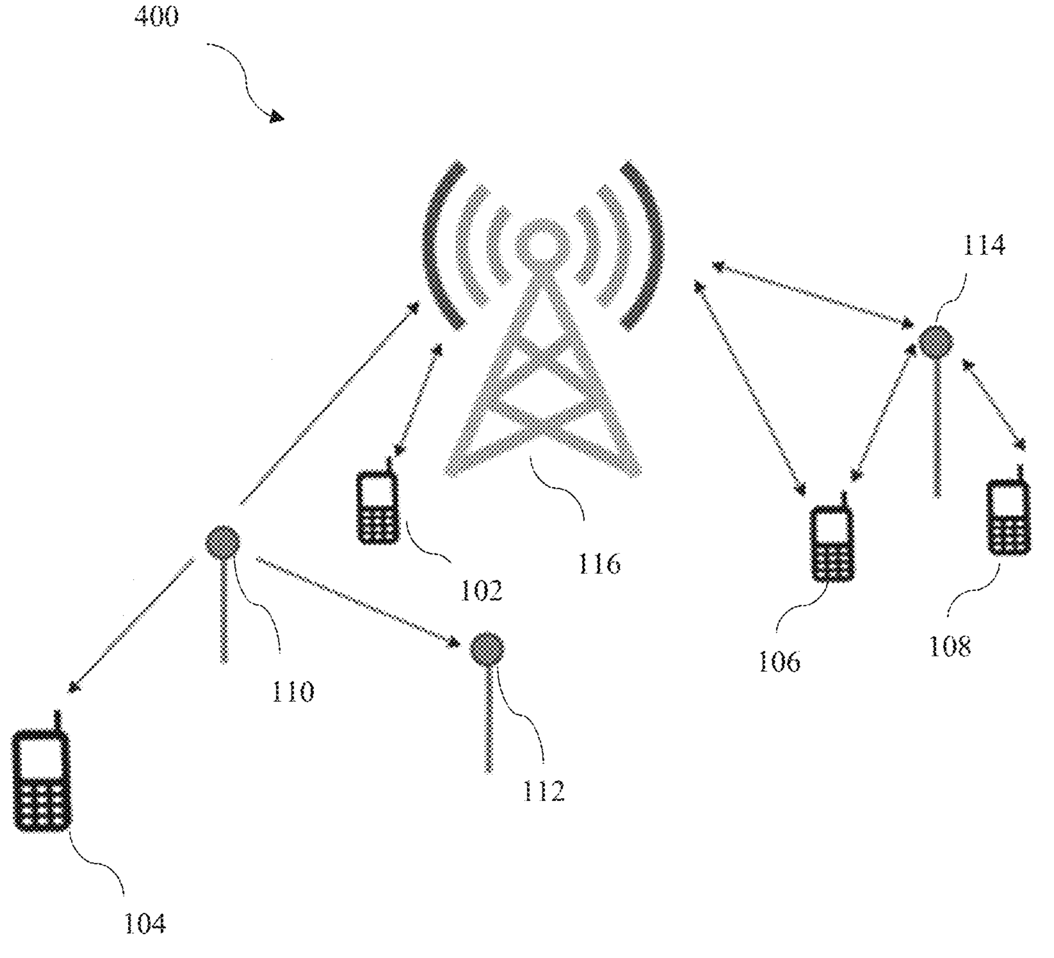
FIG. 4 illustrates transmission and reception patterns in various modes of operation of an IAB node, in accordance with an embodiment of the present invention.

In FIG. 4, IAB node 110 is in STxDM mode, where both MT and DU transmit simultaneously. This transmission can be done in any of the below mentioned ways.

i. In the same time-frequency resources but different beams, known as SDM ii. In the same time but different frequency resources on the same carrier, known as FDM.

iii. In the same time but different frequency resources on different carriers, known as FDD.

In DURx_MTTx mode, the DU receives while the MT transmits simultaneously, whereas in DUTx_MTRx mode, the DU transmits while the MT receives simultaneously. These modes are possible in the following ways.

i. In the same time-frequency resources but different beams known as SDM.

ii. In the same time but different frequency resources on the same carrier known as FDM.

iii. In the same time but different frequency resources on different carriers known as FDD.

iv. In the same time-frequency resources using IBFD capability.

Figure 5:
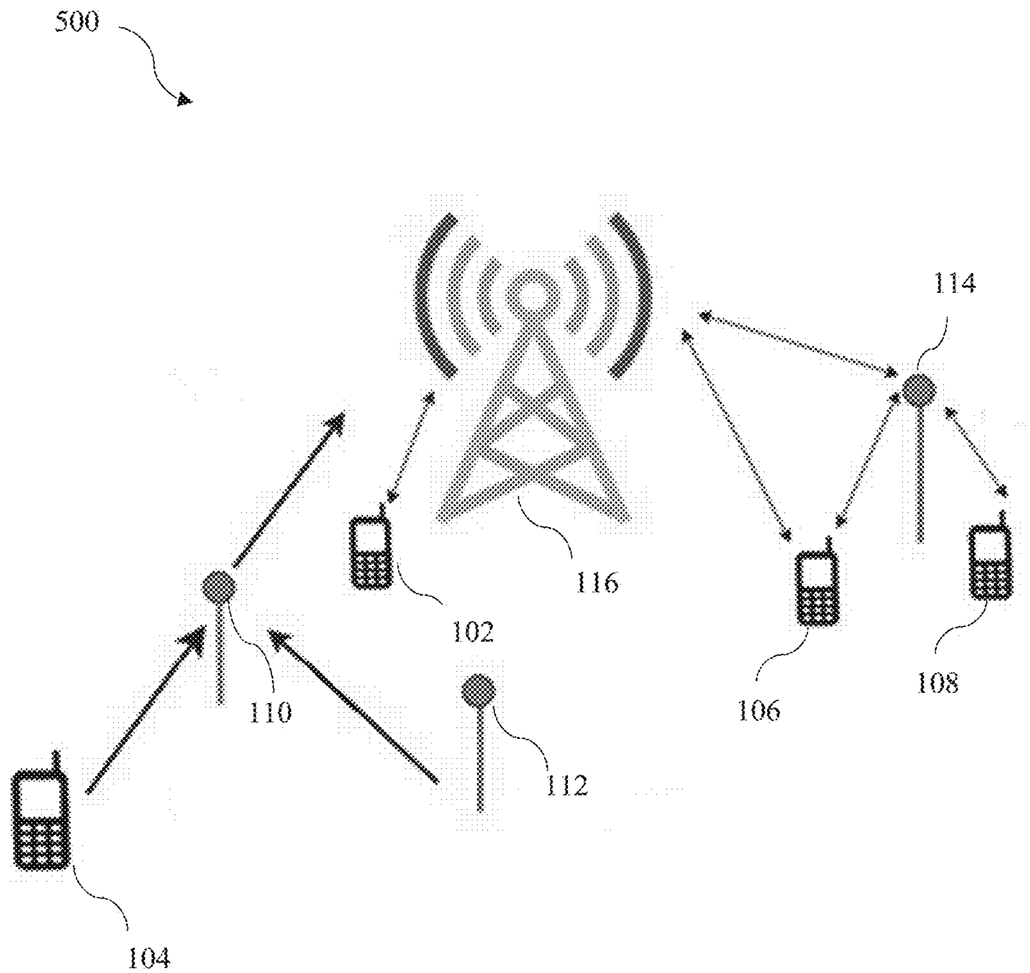
FIG. 5 illustrates transmission and reception patterns in various modes of operation of an IAB node, in accordance with an embodiment of the present invention.
Figure 6:
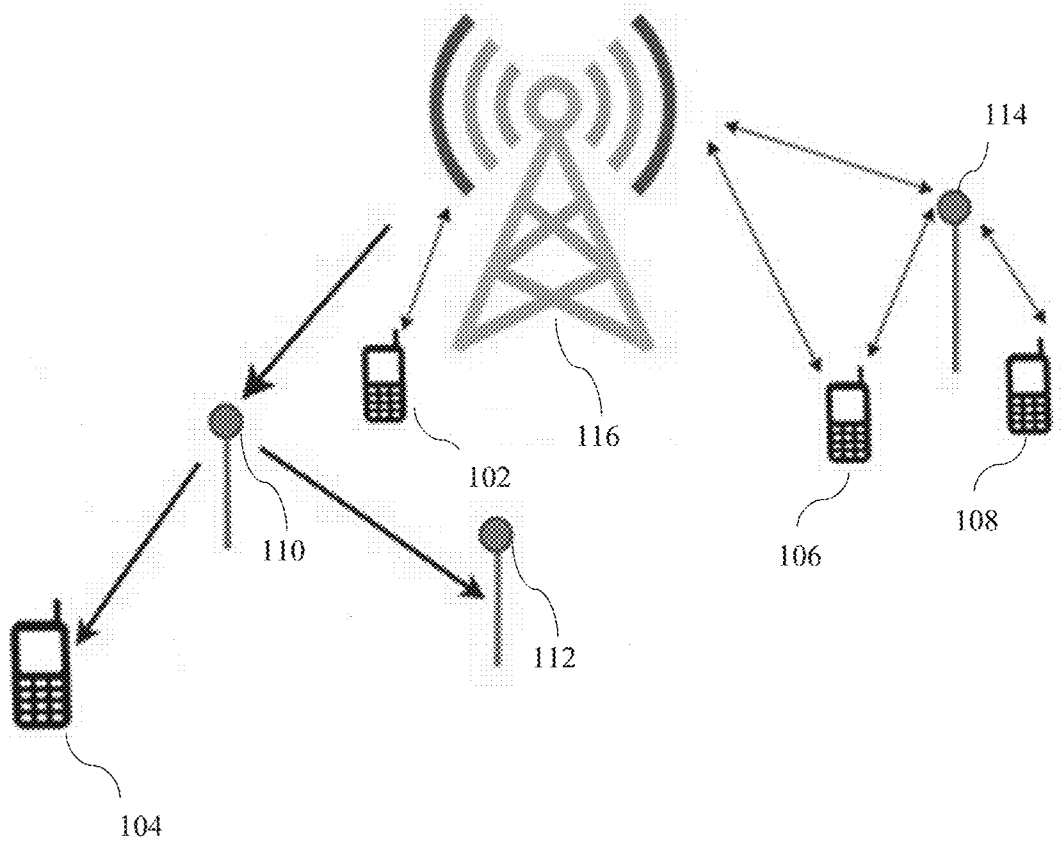
FIG. 6 illustrates transmission and reception patterns in various modes of operation of an IAB node, in accordance with an embodiment of the present invention.

As an example, in FIG. 5, MT of IAB node 110 transmits and DU of IAB node 110 receives, whereas in FIG. 6, MT of IAB node 110 receives and DU of IAB node 110 transmits.

The TDM is the simplest mode of operation and is the default mode of operation for an IAB node. However, for an IAB node with FDM/SDM capability with HDC, simultaneous transmission and/or simultaneous reception is possible in addition to TDM mode depending on the resource configuration of IAB-MT and IAB-DU, and the network conditions. Similarly, an IBFD capable node operates in DURx_MTTx and/or DUTx_MTRx mode in addition to TDM, STxDM and SRxDM modes depending on the resource configuration at MT and DU, load, and interference levels. In the case of unpaired spectrum with carrier aggregation (CA), separate carriers might be assigned for IAB-MT and IAB-DU or for DL and UL, which makes it similar to paired spectrum. Similarly, each carrier in the paired spectrum can be utilised like the single carrier of unpaired spectrum. Therefore, regardless of whether the spectrum is paired or unpaired, the IAB node can operate in any of these modes—TDM, STxDM, SRxDM, DUTx_MTRx or DURx_MTTx—if the mode is supported by the node.

In one embodiment, signalling of metrics from parent node to child node may need to be performed for association of the child node with the parent node.

In the conventional initial access process, the child node measures the Reference Signal Received Power (RSRP) or Reference Signal Received Quality (RSRQ) on Synchronisation Signal Block (SSB) transmitted by the parent node. The child node prefers a parent node with a higher value of RSRP. However, in a multi-hop scenario with varying node capability, considering RSRP alone for initial attachment is not efficient. For example, a parent node with a high RSRP value may be serving a large number of child nodes, or having a higher hop order. A large number of child nodes results in high load, whereas the delay increases with the hop order. The latency associated with a parent node with IBFD capability will be low compared to a parent node with TDM capability. Therefore, the selection of the parent node should be based on certain other parameters also, in addition to RSRP. Therefore, certain parameters should be signalled from the parent node to the child node for the child node to decide whether the parent node is suitable for its requirements. The parameters required for decision on latching needs to be conveyed at the initial access stage itself or else it may result in multiple parent node reselections. As an example, Table 1 provided below shows the parameters (in addition to RSRP) to be considered in selecting a parent node. The parameters related to the parent node include multiplexing capability, hop count, load, outage probability and interference. In the case of multi-hop network, the RSRP should be the lowest RSRP over all the hops, the outage should be considered as the outage of the weakest link across all the hops and the load to be taken as the maximum load among all the hops in the route between the CU to the child node involving that particular parent node. Signalling the above parameters about the parent node will be useful, especially in cases like Ultra-Reliable Low Latency Communication (URLLC). For example, if both the child node and the parent nodes are IBFD capable, there will be latency reduction in the communication between them, as required for URLLC applications. Hence, the child node chooses its parent node depending upon its multiplexing capability. Parameters multiplexing capability and hop count are the properties of the node whereas load and interference are beam/frequency band dependent. Therefore, the mechanism for the indication of capability and hop count may be different from the way load and interference are indicated. Signalling of a parameter associated with a parent node can be done in one or a combination of the following ways.

i. Using some reserved bits in Physical Broadcast Channel (PBCH). There are some reserved bits in PBCH which can be used.

ii. Signalling in Remaining Minimum System Information (RMSI) and Other System Information (OSI)

iii. Using RRC signalling. This is possible only after RRC connection establishment.

Table 1 provided below mentions parameters which are signalled from the parent node to the child node.

| Method | Row number | Parameter | Signalling procedure |
|---|---|---|---|
| 1 | 1 | Multiplexing capability | 3 bit field |
| | 2 | Hop order | ceil(log2(maximum number possible)) |
| | 3 | Number of child nodes associated | ceil(log2(maximum number possible)) |
| | 4 | Load | a) The no. of associated child nodes is a direct indication of the load.<br>b) The parent node can internally decide its load (high, medium or low) based on some factors like traffic, child nodes etc.<br>If b) is followed, then 2 bits can be given.<br>00-Low<br>01-Medium |

-continued

| Method | Row number | Parameter | Signalling procedure |
|---|---|---|---|
| | | | 10-High<br>Or,<br>1 bit optional field<br>0-Low<br>1-High<br>No bit indicates load is medium. |
| 2 | 5 | Joint metric of hop order, number of child nodes and load calculated at the parent node | 0-Highly loaded<br>1-Lowload |

Two methods are considered in signalling the parameters associated with a parent node. In method 1, a parent node signals the parameters independently to the child nodes, based on which child node formulate a joint metric and is used in addition to RSRP in selecting the parent node. In this method, a child node can assign weights to each parameter based on its requirement. For example, a child node with URLLC requirement assigns maximum weightage to the capability and hop count of a parent node. As an example, the formula given below can be used to find the joint metric at the child node. The child node calculates the joint metric value for each possible parent node and compares it with a predefined threshold. The child node attaches to a parent node only if the joint metric value exceeds the threshold.

Joint metric=(Multiplexing capability)−(hop order)−(number of child nodes associated)−(load)

Multiplexing capability will have values from table 2:1 to 4

Hop order: 1 to maximum value

Number of child nodes: 1 to maximum value

Load: Values from table 1

In method 2, parent node evaluates the joint metric based on the parameters other than multiplexing capability and is signalled to child node. For example, the parent node evaluates the joint metric based on the equation given below and the metric is signalled to the child node along with multiplexing capability. The child node takes the decision based on this joint metric.

Joint metric=(hop order)−(number of child nodes associated)−(load)

In one embodiment, multiplexing capability and supported modes of operation may need to be signalled. The multiplexing capability, supported modes of operation, resource configuration of MT and DU and network conditions determine the active mode of operation of an IAB node. Parent-DU configures the resources to the child-MT, whereas, the CU configures the resources to the child-DU or the child-DU decides its resource configuration. The multiplexing capability and the supported modes of operation of the child node are crucial information required at the donor and the parent nodes to configure resources to the child node efficiently. For example, in the case of a child node with FDM/SDM capability and supporting STxDM mode, the CU configures the child-DU as the DL and the parent-DU configures the child-MT as the UL so that both backhaul and child links will be active at the child node. Therefore, the child node signals its multiplexing capability and the supported modes of operation to the donor and parent nodes. The donor and the parent nodes configure the resources to the child node based on its capability, supported modes of operation and the network conditions like interference and load. The multiplexing capability and the supported modes are directly signalled from the child-DU to the CU through F1-AP interface, whereas the multiplexing capability and the supported modes are signalled from the child node to the parent node in the below mentioned ways:

i) The child-MT communicates the capability and supported modes with the parent-DU directly through a Radio Resource Control (RRC) protocol.

ii) The child-DU communicates the capability and supported modes to the CU through a F1-AP protocol. After receiving the capability and supported modes information from the child node, the CU informs the capability of the child node to the parent-DU through the F1-AP.

The multiplexing capability and supported modes of operation of the child nodes are signalled using any of the following mechanisms.

Joint signalling: The multiplexing capability and supported modes are signalled together. For example, a total of 3 bits are employed to convey the multiplexing capability and supported modes of operation as mentioned in Table 2 provided below.

Signalling as independent entities: The multiplexing capability and supported modes are signalled as independently. For example, if a single bit is used to signal the capability of the child node as TDM and non-TDM (FDM, SDM, CDM, IBFD), then the supported modes are signalled using two bits as illustrated in Table 3 provided below.

TABLE 2

Joint signalling of capability and supported modes

| Row number | Capability | Mode(s) | Signal bits |
|---|---|---|---|
| 1 | TDM | Default (TDM) | 00 |
| 2 | FDM/SDM with HD Constraint | Default, SRxDM and STxDM | 01 |
| 3 | FDM/SDM without HD constraint | Default, SRxDM, STxDM, DURx_MTTx and DUTx_MTRx | 10 |
| 4 | IBFD | Default, SRxDM, STxDM, DURx_MTTx and DUTx_MTRx | 11 |

TABLE 3

Signalling of supported modes as separate entity

| Row number | Mode(s) | Signal bits |
|---|---|---|
| 1 | Default (TDM) | 00 |
| 2 | Default, SRxDM and STxDM | 01 |
| 3 | Default, SRxDM, STxDM, DURx_MTTx and DUTx_MTRx | 10 |
| 4 | Reserved | 11 |

In one embodiment, an active mode of operation may be determined at the child node. Once the capability/supported mode of operation of the child node is known, the CU configures the resources to the child-DU based on the capability of the child node, capability and configuration of the parent node, load in the network, interference level etc. After configuring the resources to the DU of the child node, the CU signals the resource configuration of the child-DU to the parent node. Now, the parent node configures the child-MT based on the resource configurations of the parent-DU and the child-DU as well as the capabilities of the parent node and the child node. The active mode of operation of the child node is determined by the resource configurations of MT and DU. For example, a child node with SRxDM capability works in that mode only when the MT and DU are configured as DL and UL, respectively. Otherwise, the child node will operate in the TDM mode. There are two ways to configure the active mode of operation of the child node.

The active mode of operation of the child node is determined by the donor node 116 based on the capability of the child node, capability and configuration of the parent node and network conditions. For example, a child node with advanced capability such as IBFD, is configured to work in the TDM mode when the load is low or when the interference is high. The resources are allocated to the child-DU based on the mode of operation. After configuring the resources to the child-DU, the donor node 116 informs the resource configuration of the child-DU to the parent node. Now, the parent node configures the child-MT so that the child node works in the mode determined by the donor. Further, the parent can schedule an appropriate child node so that the parent node can work in the configured mode and enhance the network throughput. For example, when the parent node is working in the IBFD mode, the parent node can schedule a child node working in the IBFD mode instead of another child node in the TDM mode, so that both BH and child links of the parent node will be active. The parent node determines the active mode of operation of the child node based on two mechanisms.

After configuring the resources to the child-DU, the donor explicitly informs the mode of operation of the child node to the parent node (through F1-AP) in addition to configuration of the child-DU. This is done by control signalling from the donor to the parent node. As an example, Table 3 can be reused here by the donor to indicate the mode of operation of the child node. Donor signal bits corresponding to row 1 in Table 3 if child node is configured to operate in TDM mode.

The parent node implicitly derives the active mode of operation of the child node based on the capability of the child node and the resource configuration of the child-DU. For example, if a child node has FDM/SDM capability, support for STxDM and child-DU is configured as DL, the parent node derives the mode of operation of the child node as STxDM, and configures MT as UL for those set of slots. The advantage of this method is that no additional signalling is needed. However, implicitly deriving the mode of operation leads to uncertainty in some scenarios. For example, consider a scenario in which a donor determines the mode of operation of a child node with IBFD capability as TDM because of network conditions, and configures the resources to the child-DU accordingly. In this scenario, the parent node expects the child node to operate in FD mode based on the capability of the child node and configuration of the child-DU. However, the child node (operating in TDM mode) can communicate in the backhaul depending on the H/S/NA configuration of the DU. Further, the child node requires indication of availability from the parent node to use the S resource for communication in the DU. Implicit determination of the mode can create ambiguity when the child-DU is configured as F. For example, the child node with FDM/SDM capability and support for STxDM mode can simultaneously transmit in MT and DU only when the F resource at the DU is dynamically configured as DL, else the child node operates in TDM mode. The parent node, which is unaware of the dynamic configuration of the F resource at the child-DU cannot derive the exact mode of operation of the child node when the child-DU is F.

An example of a donor configuring the mode of operation of a child node is illustrated in FIG. 7. Consider the child node as having FDM/SDM capability and supporting STxDM and TDM modes. The steps involved are as follows.

Figure 7A:
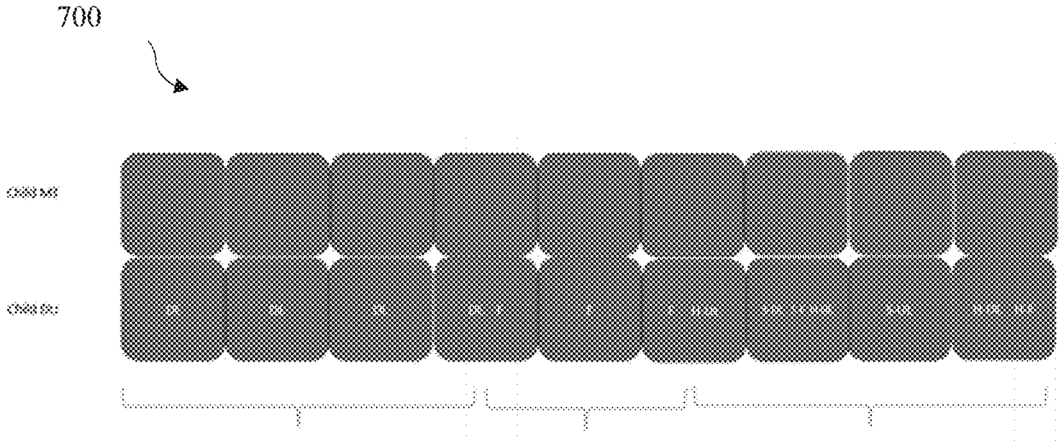
FIGS. 7*a* and 7*b* illustrate donor configuring mode of operation of child node, in accordance with an embodiment of the present invention.

Step 1: The CU configures the number of slots of the child-DU as DL so that the child node works in STxDM mode followed by slots/symbols in TDM mode as shown in FIG. 7*a*.

Step 2: The CU informs the configuration of the child-DU and the mode of operation of the child node to the parent node.

Figure 7B:
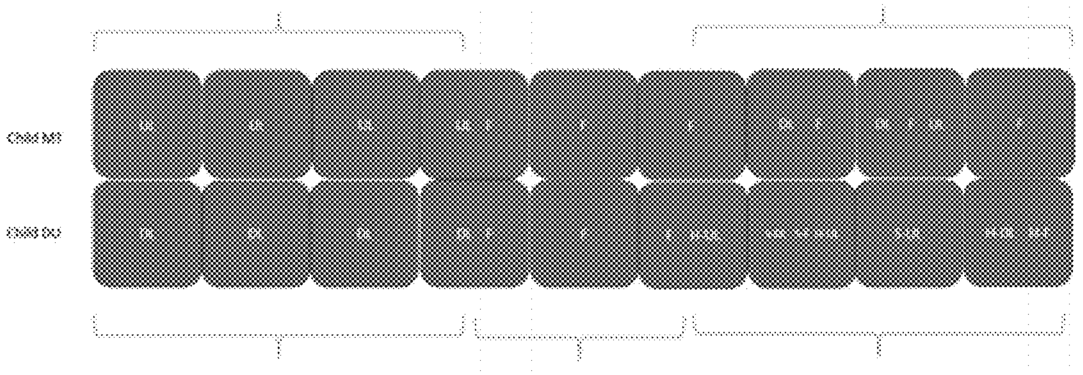

Step 3: The parent node configures the resources to the child-MT based on the capability of the child node, configuration of the child-DU and the mode of operation of the child node as shown in FIG. 7*b*.

Step 4: The parent node and the CU are aware that the child node will be in STxDM and TDM modes within the frame. So they should signal Timing Advance (TA) to be used in the BH link during STxDM and TDM mode of operation beforehand.

In one embodiment, the active mode of operation of a child node is determined by the parent node. The donor configures the resources to the child-DU, but the donor does not decide its mode of operation. The parent node knows the multiplexing capability and the configuration of the child-DU. Accordingly, the parent node assigns the resources to the MT of the child node. The mode of operation of the child node is decided by the resource configuration of the child-MT and the child-DU. For example, if the slot of a child node with FDM/SDM capability and supporting SRxDM mode is configured as UL for DU and DL for MT, the node will work in SRxDM mode, else the node will work in TDM mode in that slot. The parent and the child nodes must have a common understanding of the mode of operation of the child node in each time slot and the time instances at which the mode switches from one mode to another, so that the parameters can be adjusted at the child-MT and the child-DU to achieve proper synchronization at the parent and the child nodes. Further, the mode of operation is required at the parent and child nodes to dynamically configure the F resource at the child-MT and the child-DU, respectively. The child node determines its mode of operation based on any of the two mechanisms described below.

i) The parent node explicitly signals the mode of operation to the child node through RRC in addition to resource configuration of the child-MT. As an example, table 3 can be reused here by the parent node to indicate the mode of operation of the child node to the child node. Signalling bits corresponding to row 1 can be used to indicate the mode of operation as TDM, whereas row 2 corresponds to SRxDM.

ii) A child node implicitly derives the mode of operation based on its capability and resource configuration and/or some additional signalling like TA and guard period from the parent node. For example, if a child node has FDM/SDM capability, supports STxDM mode and MT and DU of the child node are configured as UL and DL, the child node derives its mode of operation as STxDM, based on the implicit approach. Otherwise, the child node operates in TDM based on H/S/NA configuration of the DU. Information like TA and guard period are specific to a particular mode of operation. Thus, this information can also be used by the child node to decide its active mode. The advantage is that no explicit signalling is needed from the parent node to the child node in this method. However, the child node implicitly deriving the mode of operation can lead to uncertainty in some situations. For example, consider a scenario in which a child node with IBFD capability is receiving a configuration for MT and DU. The child node implicitly derives the mode of operation as FD, based on the capability, and transmits/receives in MT and DU irrespective of the H/S/NA configuration at the child-DU. However, there are situations in which the child node with IBFD is expected to work in TDM because of the network conditions. Further, implicit determination of the mode can create ambiguity when the child-MT is configured as F. For example, if the F resource at the MT is dynamically configured as UL, the child node supporting STxDM mode and DU configured as DL can simultaneously transmit in MT and DU. Otherwise the child node operates in TDM mode. Some resources assigned to the DU of the child node by the donor can be flexible. In this case, the child-DU can decide by itself whether to transmit or receive in those F resources. The DU decides the configuration of the F resources depending on the resources configured to the MT by the parent node, mode of operation of the child node before and after the F resource. The F resource at the DU is not configured with DL/UL when there is a mode switching. Further, the H/S/NA signalling from the donor is considered only when the child node is operating in the TDM mode.

An example of the mode of operation of the child node implicitly determined based on the resource configuration of MT and DU, is illustrated in FIG. 8. In this example, a child node with FDM/SDM capability and supporting STxDM and TDM modes is considered. The steps involved are as follows.

Figure 8A:
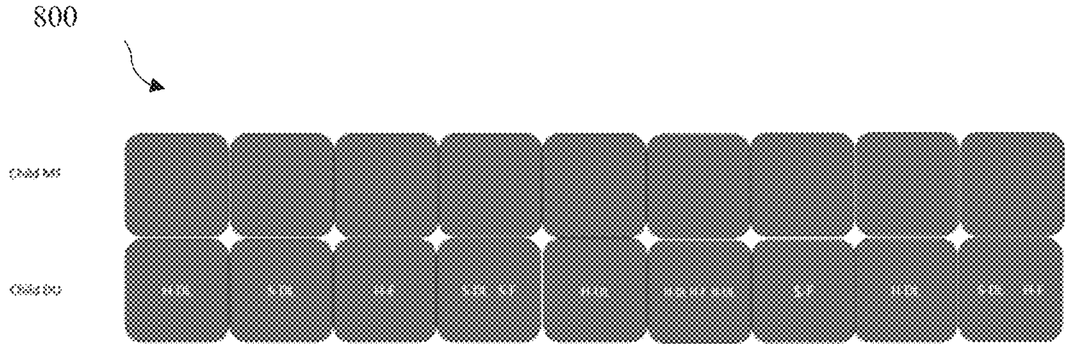
FIGS. 8*a*, 8*b* and 8*c* illustrate mode of operation of child node implicitly determined based on the resource configuration of MT and DU, in accordance with an embodiment of the present invention.

Step 1: The CU configures the resources to the child-DU as illustrated in FIG. 8*a* and informs the configuration of the child-DU to the parent node.

Figure 8B:
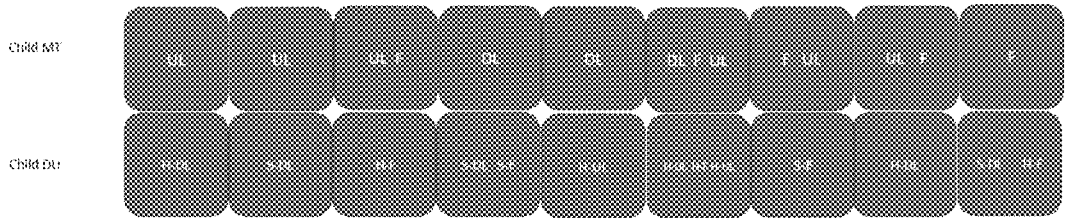

Step 2. The parent node configures the child-MT based on the capability and the supporting modes of the child node, resource configuration of the child-DU and the resource configuration of the parent-DU as shown in FIG. 8*b*.

Step 3: The parent node, aware of the resource configuration of the child-MT and the child-DU, identifies the mode of operation of the child node and signals TA to be used in the BH link during STxDM and TDM modes of operation.

Figure 8C:
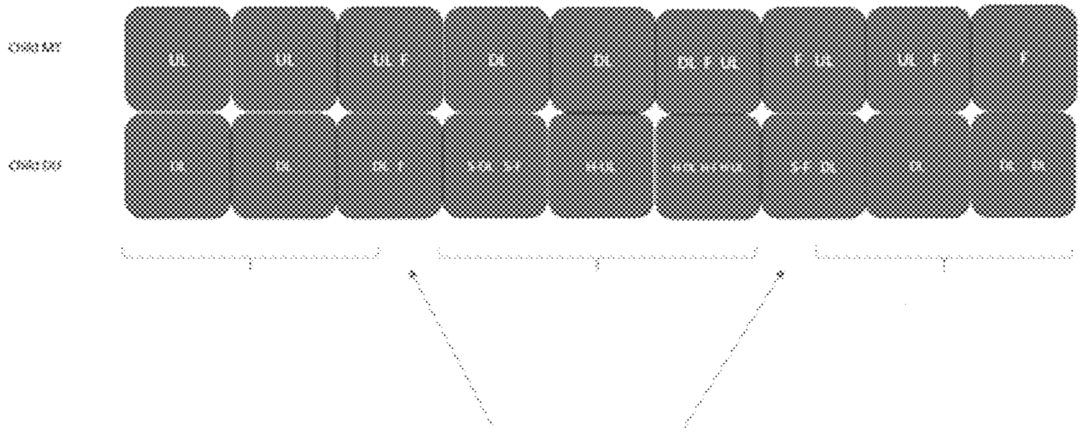

Step 4: The child node determines the mode of operation and configures F resource at DU of the child node accordingly. For example, in FIG. 8*c*, the initial portion of the H-F in slot 3 is configured as DL, so that the child node continues in the STxDM mode. Similar is the case with the F resources in the slots 7 and 9 in FIG. 8*c*. Further, the H/S/NA configuration for the DU resource is considered only when operating in the TDM mode, as indicated in FIG. 8*c*.

The active mode of operation is required at the child node to signal necessary parameters to the grandchild nodes and the access UE associated with the child node. For example, a child node in SRxDM mode signals TA for its grandchild node and access the UE such that the UL-Rx aligns with the DL-Rx, whereas a child node in the TDM mode signals TA to the grandchild nodes and access UE such that the UL-Rx aligns with the DL-Tx at the child-DU. The next section deals with the TA signalling.

In one embodiment, Timing Advance (TA) may need to be signalled for each active mode of operation. Synchronization across hops is an essential requirement to avoid interference in multi-hop IAB network. In general, the synchronization conditions are 1) Downlink Transmission (DL-Tx) from all the nodes in the network should be aligned and 2) Uplink Receptions (UL-Rx) from all the child nodes and access UE should align at the parent node. In addition, there are synchronization conditions depending on the mode of operation of the node. For example, UL-Rx at the DU and DL-Rx at the MT should align in a child node operating in the SRxDM mode, whereas DL-Tx and UL-Tx align in a child node operating in the STxDM mode. Over The Air (OTA) synchronization technique is employed to meet these requirements in an IAB network wherein the parent node signals TA value to the child nodes to adjust the UL-Rx at the parent-DU. The child nodes advance the transmission from MT by the factor TA from the reception of the DL signal at the MT. Further, the child node derives the Time Difference (TDL) between the transmission of a signal from the parent node and the reception of the signal by the child-MT based on the TA value and adjust the transmission from DU of the child node accordingly.

Figure 9:
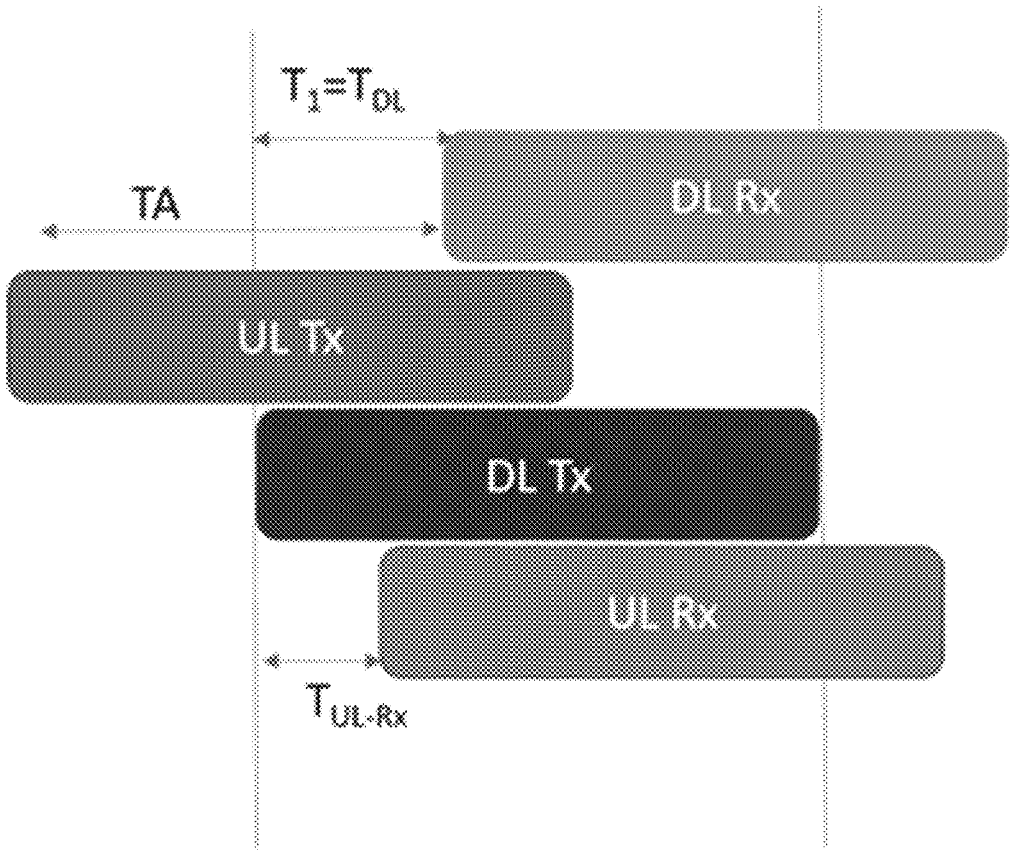
FIG. 9 illustrates the timing of various operations at child node, in accordance with an embodiment of the present invention.

FIG. 9 illustrates the timing of various operations at a child node. T1 denotes the propagation delay between the parent and the child nodes, TA denotes the timing advance value signalled by the parent node, and TUL-Rx denotes the time difference between the DL-Tx and the UL-Rx at the child node. The TA signalled by the parent node is a function of the propagation delay between the parent node and the child node (T1), the mode of operation of the child node, and the mode of operation of the parent node. For example, a parent node in TDM mode of operation signals the TA value to a child node as 2T1, whereas a parent node in SRxDM mode of operation signals the TA value to its child node as 2T1-T0, wherein T0 is the propagation delay in the BH link of the parent node. Similarly, TUL_Rx at a child node depends on the mode of operation of the child node, and its grandchild node. For example, the UL and the DL receptions should be aligned in a child node in the SRxDM mode so that TUL_Rx=T1. Similarly, a child node in TDM/STxDM mode has TUL_Rx=0, provided its grandchild can advance UL-Tx based on the TA value signalled by the child node. The child node updates the TA value signalled to the grandchild node to adjust the value of the TUL_Rx, wherein this TA value is the minimum TA required when there is a mode switch. In a practical scenario, there can be an offset to the minimum TA value as determined by the parent node and signalled to the child node.

Table 4 provided below illustrates the dependence of the TA value signalled by the parent node on the mode of operation of the parent and the child nodes. As shown in table, there are 3 typical values for TA depending on the mode of operation of the parent and child nodes. Whenever there is a mode switch at parent/child nodes, the corresponding TA value need to be signalled. However, if there is a mode switch resulting in a parent-child node combination not defined in the table, the TA value remains unchanged. In this case, no change in the TA value is signalled as compared to the TA value in the previous mode of operation. Table 5 provided below illustrates the dependence of TUL-Rx on the modes of operation of the child and the grandchild nodes and the value of the TA signalled by the child node to achieve the required TUL-Rx. Whenever there is a change in the TUL-Rx at the child node because of the mode switch at the child/grandchild node, the child node must signal the updated TA value to the grandchild node and the grandchild node should adjust the UL-Tx accordingly.

TABLE 4

| Cases | Parent node | Child node | TA signalled by parent node |
|---|---|---|---|
| 1 | TDM | TDM | $TA = 2T_1$ |
| 2 | SRxDM | TDM | $TA = 2T_1\text{-}T_0$ |
| 3 | TDM/SRxDM | STxDM | $TA = T_1$ |

TABLE 5

| Cases | Child node | Grandchild node | $T_{UL\text{-}Rx}$ at child node | TA signalled by child node |
|---|---|---|---|---|
| 1 | TDM | TDM | 0 | $2T_2$ |
| 2 | SRxDM | TDM | $T_1$ | $2T_2$-$T_1$ |
| 3 | TDM/SRxDM | STxDM | $T_2$ | $T_2$ |

A child node should receive updated TA from the parent, and should signal new TA value to the grandchild node, before switching its mode. For example, child node switching from STxDM to TDM should receive TA update, from T1 to 2T1, from parent. Similarly, the child node should update the TA signalled to grandchild node from 2T2 to 2T2-T1 before switching from TDM to SRxDM. Here, T2 denote the propagation delay between the child and the grandchild nodes. The various mechanisms used by the parent node in signalling TA to its child node and child node to grandchild node is discussed next. Even though parent-child node scenario is mentioned in the discussion, same is applicable between the child and grandchild nodes as well.

The parent signals the TA value to the child node using two different commands depending on the situation. During initialization of the child node, the parent evaluates the TA value based on the Random Access Channel (RACH) preamble received from the child node and signals the TA value to the child node in Random Access Response (RAR). After initial access, the TA is updated using MAC-CE command, wherein the difference between the required TA and the existing value of TA is signalled by the parent. The TA value signalled by parent changes when the parent node changes its mode of operation between TDM/STxDM and SRxDM. Further, the parent must update the TA value when the child node switches the mode of operation between TDM/SRxDM and STxDM. The following methods can be employed for updating the TA at the time of mode switching.

i) Initiating the RACH procedure at the time of mode switching and updating the TA value corresponding to new mode of operation in RAR ii) The TA values corresponding to each mode of operation is signalled by the parent node to the child node at the time of mode switching using MAC-CE signalling/DCI.

iii) A set of TA values for different modes of operation in a time frame is signalled at the beginning.

The TA updation using the first two methods are difficult to implement as TA is signalled using RAR and MAC-CE signalling, which has long periodicity of occurrence. However, the third method of TA updating can be employed in which the modes for which the TA value for the child node remaining the same are considered as a Timing Advance Set (TAS) and the corresponding TA value is communicated to the child node using RAR and MAC-CE. The child node adjusts the uplink transmission timing based on the current TAS, where the current TAS is communicated by the parent node to the child node using RRC. Table 6 provided below illustrates the TAS needed based on the various modes of operation.

TABLE 6

| Signalling bits | TA set | TA value | Mode of Parent | Mode of Child |
|---|---|---|---|---|
| 00 | TAS1 | $2T_1$ | TDM/STxDM | TDM/SRxDM |
| 01 | TAS2 | $2T_1$-$T_0$ | SRxDM | TDM/SRxDM |
| 10 | TAS3 | $T_1$ with guard symbols | TDM/STxDM/SRxDM | STxDM |
| 11 | Re-served | — | — | — |

Figure 10:
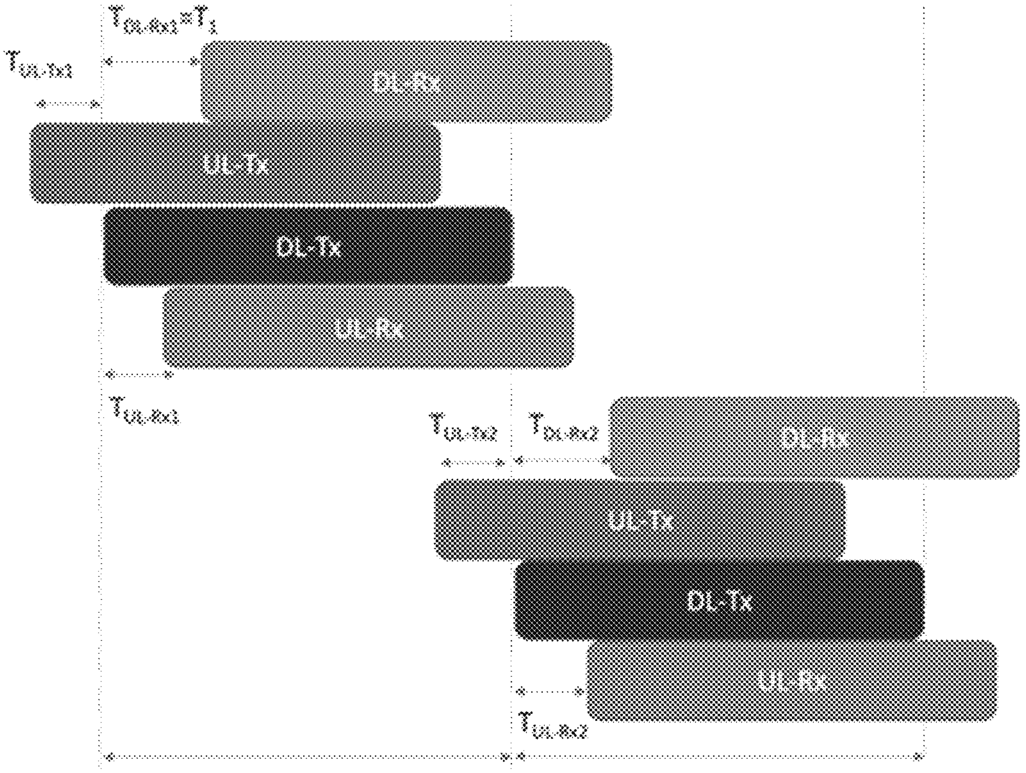
FIG. 10 illustrates all possible transitions across slots at a child node and associated overlap between slots, in accordance with an embodiment of the present invention.

In one embodiment, guard information for each active mode of operation may need to be signalled. In some cases, the signalling TA value alone cannot ensure alignment of the UL-Rx from the child nodes at the parent node. In that case, in addition to signalling the TA value, the parent node must configure the guard symbols to align the UL-Rx from various child nodes and access UEs. For example, the child node in STxDM mode must align its uplink and downlink transmissions. Therefore, a child node in STxDM mode cannot adjust its UL-Tx according to the TA signalled by the parent node and hence the parent node must configure the guard symbols to align UL-Rx from the child node in STxDM mode. Further, the misalignment of various transmission/reception at a node results in overlap between slots/symbols. For example, DL-Rx will be delayed by propagation delay in BH link and overlaps with adjacent slot. FIG. 10 illustrates all possible transitions across slots at a child node, and associated overlap between slots. Figure covers the generalized scenario in which the node works in different modes in two slots, and hence used subscript 1 and 2 to denote the timing in slot n and slot n+1, respectively. In figure, TUL-Tx denote the overlap of UL-Tx slot with the previous slot and it depends on the TA value applied at the child node as TUL-Tx=TA-T1. From figure it is clear that the resource overlap across slots occur 1) with in MT of the child node 2) with in DU of the child node and 3) between child-MT and child-DU. Further, there exist a time delay in switching from transmission to reception, and vice versa in IAB nodes and is known as transmission-reception switching time (Ts). In many cases, resource overlapping across slots is not intended and creates issues. For e.g., child node in TDM mode is configured with DL-Rx in slot n and DL-Tx in slot n+1, then DL-Rx overlap with DL-Tx at the boundary. However, either MT or DU can be active at a time in TDM mode of operation. Therefore, either MT or DU should stop transmission/reception during the overlapping portion.

The guard period required at child node for each switching case depends on the resource overlap, which depends on propagation delay in backhaul, child and access links of the child node, TA value applied for UL-Tx from the child node, and the timing of UL-Rx at the child node. From the discussions in Table 4 and Table 5 it is clear that the timing of UL-Tx at the child node depend on the mode of operation of the parent and child nodes, whereas the timing of UL-Rx at the child node depend on mode of operation of child and grandchild nodes. Based on FIG. 10, the guard period required in switching from one resource configuration to another across slots is evaluated and tabulated in Table 7 provided below. The table indicates the generalized expressions of guard duration, in terms of Ts, T1, TA and timing of UL-Rx at child node. The typical value of guard duration is obtained by evaluating the values of TA and TUL-Rx from Table 4 and Table 5, respectively based on the mode of operation of parent, child and grandchild nodes across the slots. However, in practical scenarios, the guard duration can be more than the values tabulated in Table 7. For e.g., child node operating in SRxDM mode and, MT and DU are configured as DL and UL, respectively in slot n, then resource configuration of both MT and DU in slot n overlap with slot n+1. If DU of the child node is configured as DL-Tx in slot n+1, then guard is required at MT and DU of the child node at the end of slot n. From table, the guard required for DL-Rx to DL-Tx transition is Ts+T1, whereas for UL-Rx to DL-Tx is Ts+TUL-Rx1. Since child node is in SRxDM mode for slot n, the value of TUL-Rx1 is obtained from Table 4 as T1. Therefore, both child-MT and child-DU insert guard period of Ts+T1 at the end of slot n.

TABLE 7

| From | To | Guard duration |
|---|---|---|
| DL-Rx | DL-Rx | 0 |
| | UL-Tx | $T_s + TA_2$ |
| | DL-Tx | $T_s + T_1$ |
| | UL-Rx | Max $(T_1\text{-}T_{UL\text{-}Rx2}, 0)$ |
| UL-Tx | DL-Rx | Max$(T_s\text{-}TA_1, 0)$ |
| | UL-Tx | Max$(TA_2\text{-}TA_1, 0)$ |
| | DL-Tx | Max$(T_1\text{-}TA_1, 0)$ |
| | UL-Rx | Max$(T_s\text{-}TA_1 + T_1\text{-}T_{UL\text{-}Rx2}, 0)$ |
| DL-Tx | DL-Rx | Max$(T_s\text{-}T_1, 0)$ |
| | UL-Tx | Max$(TA_2\text{-}T_1, 0)$ |
| | DL-Tx | 0 |
| | UL-Rx | Max$(T_s\text{-}T_{UL\text{-}Rx2}, 0)$ |
| UL-Rx | DL-Rx | Max$(T_{UL\text{-}Rx1}\text{-}T_1, 0)$ |
| | UL-Tx | Max$(T_s + T_{UL\text{-}Rx1} + TA_2\text{-}T_1, 0)$ |
| | DL-Tx | $T_s + T_{UL\text{-}Rx1}$ |
| | UL-Rx | Max$(T_{UL\text{-}Rx1}\text{-}T_{UL\text{-}Rx2}, 0)$ |

Resource overlap occurs within child-MT, between child-MT and child-DU, and within child-DU. The overlap within child-MT is taken care by the parent node by any one of the following methods:

i) Adjusting the scheduling: While configuring resources for child-MT, parent node ensures enough F resources between overlapping configurations.

ii) Configuring guard symbols at the beginning or end of slots.

For example, DL-Rx followed by UL-Tx will create overlap. In the former method, parent node ensures enough F symbols between DL-Rx and UL-Tx slots of child-MT, to avoid such overlap. Whereas in the latter method the parent node configures enough guard symbols at the end of DL-Rx slot or at the beginning of UL-Tx slot to avoid overlap. Further, guard-based method is employed to avoid overlap between child-MT and child-DU. Parent node, being aware of the mode of operation of child node and TA used by the child node for UL-Tx, insert guard symbols at child-MT, to avoid resource overlapping between child-MT and child-DU. For example, the parent node insert guard at the beginning of slot n+1 at child-MT, if slot n+1 is configured as UL-Tx for child-MT and slot n is DL-Tx/UL-Rx for child-DU. Similarly, the overlap within child-DU is avoided by child node itself, by adjusting the scheduling or by configuring guard symbols at the child-DU. For e.g., child node in SRxDM mode will not configure symbols at the end of slot n or inserts guard at the end of slot n, if slot n and slot n+1 are configured as UL-Rx and DL-Tx, respectively. Since the number of guard symbols at the child-MT depends on mode of operation of parent and child nodes, the parent and the child nodes should reach an agreement on the required number of guard symbols for each transition in each mode of operation, and the parent node should update the values before mode switching at either parent or child node. For example, four bits can be used to represent all the possible transitions in Table 7, and the number of guard symbols inserted by the parent node in each switching scenario is signalled by the parent node in advance. Further overlapping cases is managed by the child node itself.

Table 7 refers to resource switching scenarios associated with the child node in semi-static case and corresponding guard requirement. Even though semi-static configuration of guard symbols mentioned above works well in many cases, it leads to resource wastage in many scenarios. Further, table did not cover the resource switching associated with dynamic configuration of resources in child node. Consider the scenario in which there is a MT to DU resource switching and DU is configured as F. Based on the discussion above, parent node configure guard symbols at Child-MT to avoid resource overlap between MT and DU. However, the F resource at DU of the child node is dynamically configured by child node as DL/UL, and the guard requirement vary based on this dynamic configuration. For e.g., in case of DL-Rx to F transition at child node, guard required is Ts+T1 if F is configured as DL-Tx by Child-DU, whereas guard is max(0, Ts-TUL-Rx2) when F is configured as UL-Rx. The parent node is unaware of the dynamic configuration of F resource and hence there is uncertainty associated with guard insertion. Any one of the following strategies can be employed to avoid uncertainty associated with resource transition involving F symbols.

i) Parent node assume resource configuration of F resource as the one corresponding to maximum guard duration and inserts guard symbols accordingly. For e.g., for the DL-Rx to F resource transition, parent node inserts guard symbols of duration, which is maximum of Ts+T1 and max (0, Ts-TUL-Rx2).

ii) Parent node assumes resource configuration of F resource as the one corresponding to minimum guard duration and inserts guard symbols accordingly. For e.g., for the DL-Rx to F resource transition, parent inserts guard symbols of duration, which is minimum of Ts+T1 and max (0, Ts-TUL-Rx2).

iii) Child node informs parent node about the dynamic configuration of F resource and the parent node inserts guard based on the information. This scheme needs new signalling from child node to parent node to inform dynamic configuration of F resource.

iv) Child node dynamically configures F resource and insert guard at the start or end of F resource to avoid overlap with MT resource in adjacent slot. This may create issue when DU has to configure guard symbols at the starting of DL-Tx slot, as the initial symbols of DL-Tx slot can be configured for control signalling (PDCCH)

In one embodiment, child node is in TDM mode and resource transition involve DU resource which is configured S. In that case, the guard symbols are required in adjacent slot of MT only when explicit IA is given by parent node or implicit IA is derived by child node to use S resource at DU, where implicit IA is derived based on certain conditions. As parent node is involved in configuring guard and signalling explicit IA, parent node configure guard only when explicit IA is given. However, implicit IA is derived by child node and is unknown to parent node, and hence, parent node cannot configure guard symbols at Child-MT based on implicit IA. Therefore, child node configures guard symbols at start or end of slot at DU configured as soft, if there is resource overlap associated with S resource and implicit IA is derived for the slot.

Parent node inserts guard symbols at the Child-MT when there is resource switching within MT or between child-MT and child-DU. Similarly, child node inserts guard symbols at MT of grandchild node to avoid resource overlap within MT or between MT and DU of grandchild node. These two are independent processes and can happen simultaneously, so that guard symbols are inserted at child-MT and child-DU, leading to resource wastage. For e.g., consider the scenario in FIG. 11, where there is resource transition between MT and DU at child and grandchild nodes. Parent node insert guard at child-MT, denoted as Tg1, to avoid overlap with child-DU in adjacent slot, whereas child node insert guard at the beginning of UL-Rx slot, denotes as Tg2, to avoid resource overlap at grandchild node. In figure, guard periods at the end of slot n and slot n+1 overlap, and both child-MT and child-DU is idle at the same time, leading to resource wastage. To avoid overlap of guard symbols and associated resource wastage following solutions can be considered.

i) Child node signals the duration of guard symbols inserted at the child-DU to parent node, and the parent node configure guard at child-MT such that the guard at MT and DU will not overlap ii) Child node evaluates the guard required at child-MT to avoid overlap based on guard already present in child-DU, and dynamically informs the guard required at child-MT to parent node.

Figure 11:
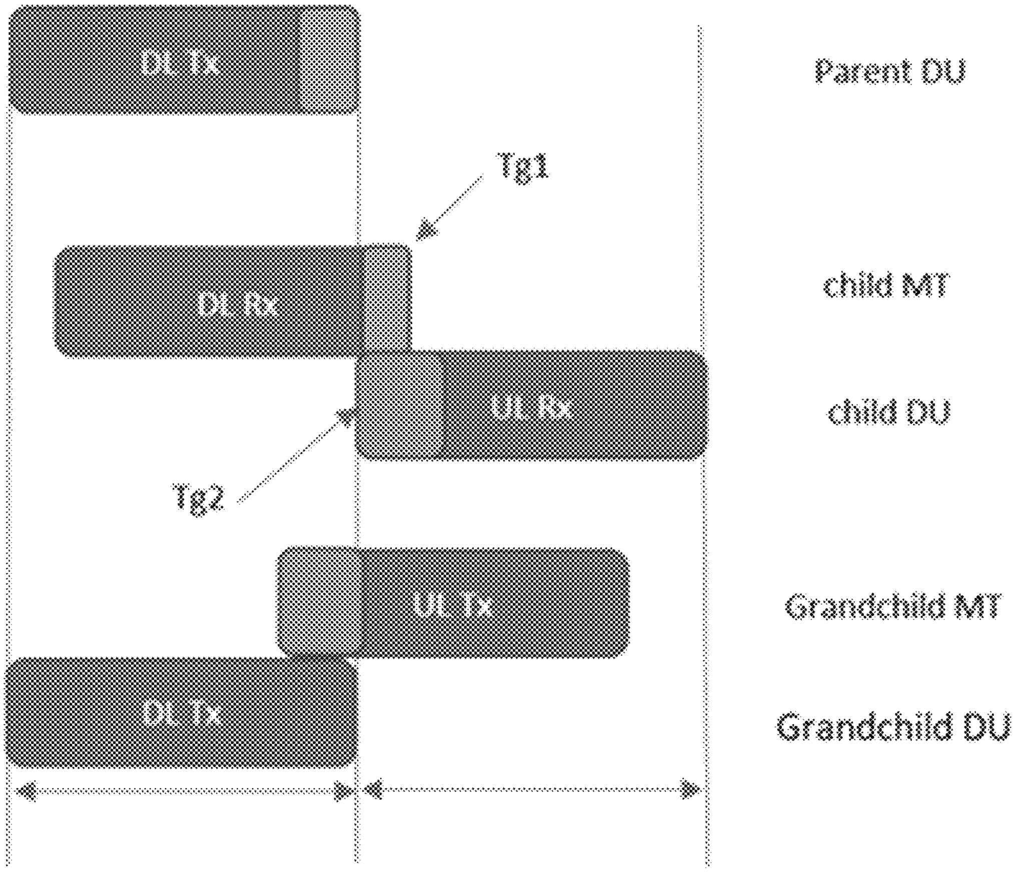
FIG. 11 illustrates resource transition between MT and DU at child and grandchild nodes, in accordance with an embodiment of the present invention.

If guard at child-DU is higher than guard at child-MT, i.e., Tg1<Tg2 in FIG. 11, then parent node need not insert any guard symbol at child-MT. On the other hand, when guard required at child-DU is lower than guard at child-MT, i.e., Tg1>Tg2 in FIG. 11, then parent node inserts guard symbol of duration which is difference of guard duration in child-MT and child-DU, i.e., Tg1-Tg2. In the former method child node signals Tg2 and parent node evaluates the guard duration based on Tg1 and Tg2, whereas in the latter one child signals either 0 or Tg1-Tg2 to parent node based on the relative magnitude of Tg1 and Tg2.

Table 8 provided below summarizes the possible signalling associated with child node in each mode switching operation. Each row is the current mode of operation and each column represents the mode of operation the child node switches to. For e.g., 1st row and 2nd column of the table describes the operations required when child node switches from TDM to STxDM. In table, T1 denotes the propagation delay in backhaul link of child node and T2 denotes the propagation delay between child node and grandchild node/access UE. From the table, it is clear that a number of signalling is involved between parent and child node when either parent or child node switches its mode. Below mentioned two approaches could be used for the signalling i) Parent node signals all parameters associated with new mode, i.e., mode of operation, duration of the mode, TA and guard values, apriori in the background. The child node makes necessary adjustments beforehand and switches to new mode directly in the corresponding slot.

ii) Child node stops transmission/reception in MT and DU before mode switching. Parent node signals necessary information and child node updates.

TABLE 8

| | TDM | STxDM | SRxDM | IBFD |
|---|---|---|---|---|
| TDM | — | Node has STxDM capability & MT and DU are configured as UL and DL, respectively<br>CU should not signal H/S/NA<br>Parent node signals the new mode of operation of the child node and the duration of the new mode<br>Parent node update TA from 2T1 to T1 and inserts guard symbols in UL slots to achieve proper alignment of UL-Rx at parent node<br>Parent node signals updated guard table to the child node | Node has SRxDM capability & MT and DU are configured as DL and UL, respectively<br>CU should not signal H/S/NA<br>Parent node signals the new mode of operation of the child node and the duration of the new mode<br>Parent node signals updated guard table to child node<br>Child node update TA to grandchild/access UE from $2T_2$ to $2T_2$-$T_1$ | Node is IBFD capable<br>Self-interference is manageable by the child node<br>Child informs CU that it can operate in IBFD<br>CU should not signal H/S/NA to child-DU<br>CU inform parent node about non signalling of H/S/NA<br>Parent node signals the new mode of operation of the child and the duration of the new mode<br>Parent node, communicates with child-MT irrespective of H/S/NA configuration of child-DU<br>Parent node signals updated guard table to the child node |
| STxDM | IBFD not supported and RA violates HDC<br>CU signal H/S/NA<br>CU inform parent node about H/S/NA configuration of child-DU<br>Parent node schedule child-MT based on the | — | Node with SRxDM capability and, MT and DU configured as DL and UL, respectively<br>Parent node signals the new mode of operation of the child node and the duration of the new mode<br>Parent node | Based on capability and RA<br>Parent node signals the new mode of operation of the child and the duration of the new mode<br>Parent node signals updated guard table to child<br>Parent node update TA signalled to |

TABLE 8-continued

| | TDM | STxDM | SRxDM | IBFD |
|---|---|---|---|---|
| | H/S/NA configuration of child-DU<br>Parent node signals the new mode of operation of the child node and the duration of the new mode<br>Parent node update TA signalled to child node from T1 to 2T1<br>Parent node signals updated guard table to child node | | signals updated guard table to child node<br>Parent node updates TA signalled to child node from T1 to 2T1<br>Child node update TA to grandchild/ access UE from 2T2 to 2T2-T1 | child node from T1 to 2T1 |
| SRxDM | FD not supported and RA violates HDC<br>CU signal H/S/NA<br>CU inform parent-Du about H/S/NA configuration of child-DU<br>Parent node signals the new mode of operation of the child node and the duration of the new mode<br>Parent node schedule child-MT based on the H/S/NA configuration of the child-DU<br>Parent node signals updated guard table to child node<br>child node update TA signalled to grandchild/access UE from 2T2-T1 to 2T2 | Based on capability and RA<br>Parent node signals the new mode of operation of the child node and the duration of the new mode<br>Parent node signals updated guard table to child node<br>Parent node update the TA signalled to child from 2T1-T0 to T1<br>Child-DU updates the TA signalled to grandchild node/ access UE from 2T2-T1 to 2T2 | — | Based on capability and RA<br>Parent node signals the new mode of operation of the child and the duration of the new mode<br>Parent node signals updated guard table to child<br>child node updates the TA signalled to grandchild node/ access UE from 2T2-T1 to 2T2 |
| IBFD | Child node cannot manage self-interference<br>Minimize interference when traffic is low<br>CU signal H/S/NA<br>CU inform parent-DU about H/S/NA configuration of child-DU<br>Parent node signals the new mode of operation of the child and the duration of the new mode<br>Parent node schedule child-MT based on the H/S/NA configuration of child-DU<br>Parent node | Based on capability and RA<br>Parent node signals the new mode of operation of the child node and the duration of the new mode<br>Parent node update the TA signalled from 2T1 to T1<br>Parent node signals updated guard table to child node | Based on capability and RA<br>Parent node signals the new mode of operation of the child and the duration of the new mode<br>Parent node signals updated guard table to child node<br>Child node update the TA signalled to child node from 2T2 to 2T2-T1 | — |

TABLE 8-continued

| TDM | STxDM | SRxDM | IBFD |
| --- | --- | --- | --- |
| signals updated guard table to child node | | | |

In one embodiment, fallback capability of IAB nodes may need to be signalled. In one scenario, a child node operates in IBFD mode. Due to high amount of interference at the AC/BH link, the performance starts degrading. Hence, the child node needs to switch to/fallback to the default mode. It signals the parent node and donor to indicate that it wants to fallback to default mode. This can be using RRC or uplink control information (UCI). The parent node and the donor signal the child node a new set of configurations for the default mode of operation. Any other signalling like TA, guard period etc. can also be signalled or the child node can use the default table (as mentioned earlier) to begin its operation in default mode. However, the child node cannot fallback by itself unless it receives any new configuration which allows it to fallback. This ensures that the final decision always lies with the parent node. The child node continues to operate in its current mode until it receives any control from the parent node. Even in IBFD mode, few resources are configured in a way such that there is default mode of operation (like few slots in TDM mode). This will ensure that, even if the child node does not receive any control information regarding mode change from the parent node, it can operate in the default mode in these slots. If the parent node falls back to default mode from its current mode of operation, it will affect the UL/DL configuration, TA and guard period of the child node associated with it. Hence, the parent node must signal the new parameters to the child node.

In one embodiment, interference measuring occasions may need to be signalled for IBFD mode of operation. When an IAB node operates in IBFD mode, it requires to measure the self-interference (SI) periodically. For e.g., the DU measures the SI from the MT and vice versa. During measurement, the IAB node should only focus on the measurement and no other transmission/reception should take place apart from the transmission/reception at the IAB node required to measure the SI. Hence, the MT of the IAB node requires to inform the DU of its parent node (since it is under the control of the parent node) that BH link should be switched off for some time. During this time, the IAB node performs its SI measurement. There are two ways to signal this as provided below:

i) Signal the parent node (RRC or UCI) asking for a measurement guard period whenever required. The measurement guard period is in terms of absolute time or for a fixed number of OFDM symbols.

ii) After exchange of multiplexing capability information, the IAB node signals the periodicity and duration of the measurement guard period (RRC) required to the parent node.

Other scenarios involving IBFD are described below. In one case, DU may be Half Duplex (HD) capable and UE may be IBFD capable. In such case, the UE can transmit and receive in the same time-frequency resources. Thus, it performs UL and DL simultaneously. However, since the DU is HD capable (either receive or transmit at a given time), the UE must be connected to two parent node DUs at the same time to use its IBFD capability. UE is configured with UL by one parent node and DL by other. Since, the UE is associated with 2 parent nodes, it receives resource configurations from both the parent nodes. The resource configurations are such that both UL and DL are allowed simultaneously at the UE. The parent nodes communicate with each other to provide proper configurations to the UE such that the resource configurations provided to the UE does not violate the capability of the UE. For e.g., if both the parent nodes configure UL in the same time-frequency resources, the UE will not be able to perform this.

In another case, parent-DU may be IBFD capable (DUTx_ DURx) and UE may be IBFD capable. In such case, the DU is capable of simultaneous transmission and reception (DUTx_DURx). Since both are IBFD capable, there is no need for any configuration signalling at UE or DU.

In yet another case, MT may be HD capable and DU may be IBFD capable (DUTx_DURx). In such case, the IAB node supporting DUTx_DURx mode of operation, signals it to its parent node. Since the DU is IBFD capable, there is no need for a resource configuration for the DU to be given by the donor. Depending on the multiplexing capability between the DU and the MT and the resource configuration at MT, the DU can adjust its transmission and reception. MT should receive resource configuration from the parent node.

In yet another case, MT may be IBFD capable (MTTx_MTRx) and DU may be HD capable. In such case, the MT is capable of simultaneous transmission and reception (MTTx_MTRx). Here, the DU receives a resource configuration from the donor. The child-MT signals the parent node that it is capable of supporting MTTx_MTRx mode of operation. If the MT is connected to an IBFD parent-DU, then no resource configuration is required at the MT. The parent-DU knows the resource configuration of the child-DU and the multiplexing capability. Based on this, the parent-DU decides whether to transmit DL to the child-MT such that the multiplexing capability of the child node is not violated. For e.g., the child node has only TDM multiplexing capability. The parent-DU should not transmit to the child-MT in resources where the child-DU is operating. However, if the MT is connected to a HD parent-DU, then MT will receive a resource configuration from the parent node and operate in a HD mode.

In yet another case, MT and DU may both be IBFD capable. In such case, resource configuration is not required at the DU. However, MT will require a resource configuration if it is connected to a HD parent node. The child node signals MTTx_MTRx and DUTx_DURx supported modes of operation to the parent node.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of signalling in an Integrated Access and Backhaul (IAB) network, the method comprising at least one of:

a) signalling, from a parent IAB node to a child IAB node, information required for association of the child IAB node with the parent IAB node, wherein the information required for association includes one of:

i) at least one of multiplexing capability, hop order, number of child IAB nodes associated, outage probability, and interference and load of the parent IAB node, and ii) a joint metric calculated by the parent IAB node based on at least one of the multiplexing capability, the hop order, the number of child IAB nodes associated, the outage probability, and the interference and load of the parent IAB node, and b) reporting, either separately or jointly, information related to the multiplexing capability and supported modes of operation from the child IAB node to at least one of a Central Unit (CU) of a donor node and the parent IAB node;

wherein the reporting is done by one of:

a distributed unit (DU) of the child IAB node to the CU of the donor node through an F1-application protocol (F1-AP) interface, and by a mobile termination (MT) of the child IAB node to a DU of the parent IAB node connected to the parent IAB node, and the DU of the child IAB node to the CU of the donor node through the F1-AP interface, wherein the CU of the donor node forwards the information related to the multiplexing capability and the supported modes of operation to the DU of the parent IAB node through the F1-AP interface.

2. The method as claimed in claim 1, wherein the information required for association is used by the child IAB node to calculate the joint metric.

3. The method as claimed in claim 1, wherein the parent IAB node signals the joint metric along with the multiplexing capability to the child IAB node.

4. The method as claimed in claim 1, further comprising:

determining an active mode of operation at the child IAB node by one of the donor node, the parent IAB node and the child IAB node, and performing at least one of:

exchanging information regarding switching from one active mode to another active mode, exchanging information regarding default mode, exchanging information related to Timing Advance (TA) for each active mode of operation, exchanging information related to guard time for each active mode of operation, and exchanging information related to In-Band Full Duplexing (IBFD) mode of operation.

5. The method as claimed in claim 4, wherein the active mode of operation of the child IAB node is determined by the donor node based on the at least one of multiplexing capability and supported modes of the child IAB node, multiplexing capability, supported modes, and resource configuration of the parent IAB node, and network conditions.

6. The method as claimed in claim 5, wherein the active mode of operation of the child IAB node determined by the donor is communicated to at least one of the parent IAB node and the child IAB node.

7. The method as claimed in claim 4, wherein the active mode of operation of the child IAB node is determined by the parent IAB node based on at least one of multiplexing capability and supported modes of the child IAB node, resource configuration of the DU of the child IAB node, and active mode of operation of the parent IAB node.

8. The method as claimed in claim 4, wherein the active mode of operation is derived by the child IAB node by one of explicit signalling from one of the donor node and the parent IAB node, and implicitly based on at least one of resource configuration of the MT and DU of the child IAB node, multiplexing capability of the child IAB node, supported modes of the child IAB node, and additional information including TA and guard period received from the parent IAB node.

9. The method as claimed in claim 4, further comprises signalling a duration of the active mode of operation by the parent IAB node to the child IAB node.

10. The method as claimed in claim 4, wherein the active mode of operation at the child IAB node is a default mode when information regarding a switch from one active mode to another active node is not received by the child IAB node from the parent IAB node.

11. The method as claimed in claim 10, wherein the default mode is signalled to the child IAB node by the parent IAB node.

12. The method as claimed in claim 4, wherein the TA signalled from the parent IAB node to the child IAB node depends on at least one of the active mode of operation of the parent IAB node, the active mode of operation of the child IAB node, and timing of UL reception at the parent IAB node.

13. The method as claimed in claim 4, wherein an offset to the TA is signalled from the parent IAB node to the child IAB node.

14. The method as claimed in claim 4, wherein the TA is updated by one of:

initiating a Random Access CHannel (RACH) procedure and updating TA value corresponding to a new mode of operation in Random Access Response (RAR) when a mode switch happens, signalling the TA value corresponding to a new mode of operation by the parent IAB node to the child IAB node, when the active mode of operation is switched by at least one of the parent IAB node and the child IAB node, and signalling a set of TA values for all possible modes of operation for a time frame from the parent IAB node to the child IAB node.

15. The method as claimed in claim 4, wherein guard information for each active mode includes guard symbols, wherein the guard symbols depends on at least one of:

resource configuration of MT and DU of an IAB node, propagation delay in a backhaul link of the IAB node, Downlink (DL) to Uplink (UL) and UL to DL switching time required at the IAB node, TA used for Uplink Transmission (UL-Tx) at the IAB node, wherein the TA used for UL-Tx depends on an active mode of operation of the IAB node and its parent node, and a timing of Uplink Reception (UL-Rx) at the IAB node, wherein the timing of UL-Rx depends on an active mode of operation of the IAB node and its child IAB node.

16. The method as claimed in claim 4, wherein exchanging guard information includes one of:

signalling the guard information for all possible modes of operation from the parent IAB node to the child IAB node, and signalling the guard information corresponding to a new mode of operation by the parent IAB node to the child IAB node, when the active mode of operation is switched by at least one of the parent IAB node and the child IAB node.

17. The method as claimed in claim 4, wherein signalling of guard information to prevent overlap between resources at MT and DU of the child IAB node when the DU of the child IAB node is configured as Flexible (F) resource, comprises one of:

parent IAB node inserts guard at the MT of the child IAB node assuming resource configuration of F resource at the DU of the child IAB node as the one corresponding to maximum guard duration, parent IAB node inserts guard at the MT of child IAB node assuming resource configuration of F resource at the DU of the child IAB node as the one corresponding to minimum guard duration, parent IAB node inserts guard at the MT of child IAB node based on dynamic configuration of the F resource at the DU of the child IAB node, wherein the child IAB node signals the dynamic configuration of the F resource to the parent IAB node; and child IAB node dynamically configures the F resource at the DU such that guard is inserted at a start or end of the F resource to avoid overlap with MT, and wherein the F resource is at least one of uplink, downlink, and guard.

18. The method as claimed in claim 4, wherein signalling of guard information when there is overlap between MT and DU of the child IAB node and the DU of the child IAB node is configured as soft resource, comprises one of:

the parent IAB node configures guard only when explicit Indication of Availability (IA) is given for soft resource at the DU of the child IAB node and the child IAB node configures guard at least one of start and end of the soft resource, when implicit IA is derived for the soft resource.

19. The method as claimed in claim 4, wherein signalling of guard information comprises parent IAB node configuring the guard at MT of child IAB node based on at least one of:

the guard inserted at DU of the child IAB node which is signalled by the child IAB node to the parent IAB node, the guard required at MT of the child IAB node which is signalled by the child IAB node to the parent IAB node.

20. The method as claimed in claim 19, further comprising evaluating, by the child IAB node, the guard required at MT of the child IAB node based on the guard present in DU of the child IAB node.

21. The method as claimed in claim 4, wherein the signalling exchanges for IBFD mode of operation comprises the child IAB node informing the parent IAB node about the IBFD capability of at least one of MT and DU of the child IAB node.

22. The method as claimed in claim 4, wherein the signalling exchanges for IBFD mode of operation comprises two parent nodes exchanging resource configuration information for proper scheduling of an IBFD capable User Equipment (UE) when the UE simultaneously connects with the two parent nodes with Half Duplex (HD) capable DUs.

23. The method as claimed in claim 1, further comprising signalling exchanges regarding at least one of switching mode of operation and interference measurement.

24. The method as claimed in claim 23, wherein the signalling exchange for interference measurement further comprises the child IAB node requesting a measurement guard period to the parent IAB node, wherein the guard period is one of periodic and aperiodic, and is requested in terms of one of absolute time and number of symbols.

25. The method as claimed in claim 24, when periodic, the periodicity of the guard period is requested in terms of one of absolute time, number of symbols, number of slots, number of subframes, and number of frames.

26. The method as claimed in claim 23, wherein the signalling exchanges for switching mode of operation comprises the child IAB node requesting the parent IAB node for switching to a different mode of operation.

27. The method as claimed in claim 26, further comprising the child IAB node switching to the different mode of operation on receiving grant from the parent IAB node.

28. The method as claimed in claim 23, wherein the signalling exchanges for switching mode of operation comprises the parent IAB node signalling to the child IAB node grant for mode switching and necessary parameters associated with a new mode wherein the parameters are at least one of TA, guard, and measurement guard period.

* * * * *